United States Patent
Spotnitz et al.

(10) Patent No.: US 10,283,015 B2
(45) Date of Patent: May 7, 2019

(54) DEVICE AND METHOD FOR SIMULATION OF SURFACE BLEEDINGS

(71) Applicant: Biom'Up, Saint-Priest (FR)

(72) Inventors: William Spotnitz, Gainesville, FL (US); Patricia Forest, Genas (FR); Catherine Wittmann, Corbas (FR); Vincent Guyot, Corbas (FR); Sylvain Picot, Lyons (FR)

(73) Assignee: Biom'Up, Saint-Priest (FR)

( * ) Notice: Subject to any disclaimer, the term of this patent is extended or adjusted under 35 U.S.C. 154(b) by 151 days.

(21) Appl. No.: 14/681,305

(22) Filed: Apr. 8, 2015

(65) Prior Publication Data
US 2016/0300509 A1 Oct. 13, 2016

(51) Int. Cl.
*G09B 23/28* (2006.01)
*G09B 23/30* (2006.01)

(52) U.S. Cl.
CPC .......... *G09B 23/303* (2013.01); *G09B 23/28* (2013.01)

(58) Field of Classification Search
CPC .............................. G09B 23/303; G09B 23/28
USPC ................................................. 434/268, 272
See application file for complete search history.

(56) References Cited

U.S. PATENT DOCUMENTS

| | | | | |
|---|---|---|---|---|
| 2,545,281 A | * | 3/1951 | Hunt | G01N 33/346 73/159 |
| 3,027,655 A | * | 4/1962 | Alderson | G09B 23/32 434/268 |
| 4,604,894 A | | 8/1986 | Kratzer et al. | |
| 5,147,343 A | * | 9/1992 | Kellenberger | A61F 13/531 604/368 |
| 5,316,730 A | | 5/1994 | Blake et al. | |
| 5,361,627 A | * | 11/1994 | Levesque | B01L 3/5023 422/947 |
| 5,495,872 A | * | 3/1996 | Gallagher | F15D 1/025 138/40 |

(Continued)

FOREIGN PATENT DOCUMENTS

| | | | |
|---|---|---|---|
| GB | 2416909 A | * 2/2006 | ............ A61L 15/42 |
| WO | 00/33894 A1 | 6/2000 | |

(Continued)

OTHER PUBLICATIONS

International Search Report and Written Opinion issued in corresponding PCT Application No. PCT/EP2016/057611, dated Sep. 1, 2016.

(Continued)

*Primary Examiner* — James Hull
(74) *Attorney, Agent, or Firm* — Banner & Witcoff, Ltd.

(57) ABSTRACT

A device to simulate a surface bleeding is provided. The device includes
  A source of a blood liquid;
  A pump system connected to the source of blood liquid and configured to provide a controlled flow of said blood liquid;
  A wound simulator having an open chamber connected to the pump system to receive the controlled flow of blood liquid, wherein the wound simulator includes a set of interchangeable plates
    having a plurality of holes arranged through said plates according to a specific pattern, and
    each plate being adapted to be removably mounted on the wound simulator to close the open chamber, so that blood liquid flows out of the chamber through the holes of the plate mounted on the wound simulator.

30 Claims, 6 Drawing Sheets

(56) References Cited

U.S. PATENT DOCUMENTS

| | | | | |
|---|---|---|---|---|
| 6,085,579 | A * | 7/2000 | Herrlein | A61F 13/84 604/358 |
| 6,138,500 | A * | 10/2000 | Steger | A61F 13/15203 73/73 |
| 6,187,872 | B1 * | 2/2001 | Yanase | A61L 15/60 525/330.2 |
| 6,557,398 | B2 * | 5/2003 | Lindmark | G01N 15/0893 100/131 |
| 7,779,685 | B2 * | 8/2010 | Kallmes | G01N 5/025 73/159 |
| 7,862,339 | B2 * | 1/2011 | Mulligan | A61M 27/00 434/268 |
| 9,016,112 | B2 * | 4/2015 | Paz | A61F 13/15203 73/73 |
| 9,200,650 | B2 * | 12/2015 | Van Buskirk | F15D 1/025 |
| 2002/0120410 | A1 * | 8/2002 | Pourdeyhimi | G01N 15/0893 702/30 |
| 2004/0019342 | A1 * | 1/2004 | Nagasuna | A61F 13/15203 604/385.01 |
| 2004/0092658 | A1 * | 5/2004 | Qin | C08J 3/12 524/800 |
| 2007/0243512 | A1 * | 10/2007 | King | G09B 23/28 434/268 |
| 2007/0292829 | A1 * | 12/2007 | King | G09B 23/285 434/268 |
| 2008/0145829 | A1 * | 6/2008 | Huang | G09B 9/00 434/308 |
| 2009/0107230 | A1 * | 4/2009 | Okcay | G01M 10/00 73/148 |
| 2009/0215617 | A1 * | 8/2009 | Kimura | C08J 3/245 502/402 |
| 2009/0298685 | A1 * | 12/2009 | Torii | A61L 15/18 502/402 |
| 2010/0268197 | A1 * | 10/2010 | Larsson | A61M 1/00 604/543 |
| 2012/0045742 | A1 * | 2/2012 | Meglan | G09B 23/28 434/268 |
| 2014/0017650 | A1 * | 1/2014 | Romero | G09B 23/30 434/270 |
| 2015/0233493 | A1 * | 8/2015 | Irgens-Hagevik | F16L 55/02718 251/120 |
| 2016/0247419 | A1 * | 8/2016 | Parry | G09B 9/003 |

FOREIGN PATENT DOCUMENTS

| | | |
|---|---|---|
| WO | 00/34556 A1 | 6/2000 |
| WO | 00/51485 A2 | 9/2000 |
| WO | 00/51485 A3 | 9/2000 |
| WO | 2008/016983 A2 | 2/2008 |
| WO | 2011/151400 A1 | 12/2011 |
| WO | 2013/060770 A1 | 5/2013 |
| WO | 2014/086996 A1 | 6/2014 |

OTHER PUBLICATIONS

Mylan Corp., Acyclovir-acyclovir ointment, Mylan Pharmaceuticals Inc., Feb. 1, 2013, XP055297261, Retrieved from the Internet: URL:http://dailymed.nlm.nih.gov/dailymed/getFile.cfm?setid=ce3d5e8b-9401-40be-8ce7-4-ea42113f4ab&type=pdf&name=ce3d5e8b-9401-40be-8ce7-4ea42113f4ab [retrieved on Aug. 24, 2016] Section "Dosage and Administration".

European Search Report issued in corresponding European Application No. EP 15305517.3, dated Sep. 10, 2015.

Adams et al., Acute in-vivo evaluation of bleeding with Gelfoam plus saline and Gelfoam plus human thrombin using a liver square lesion model in swine, Journal of Thrombosis and Thrombolysis, Kluwer Academic Publishers, Bo, Jul. 16, 2008 (Jul. 16, 2008), pp. 1-5, vol. 28, No. 1.

* cited by examiner

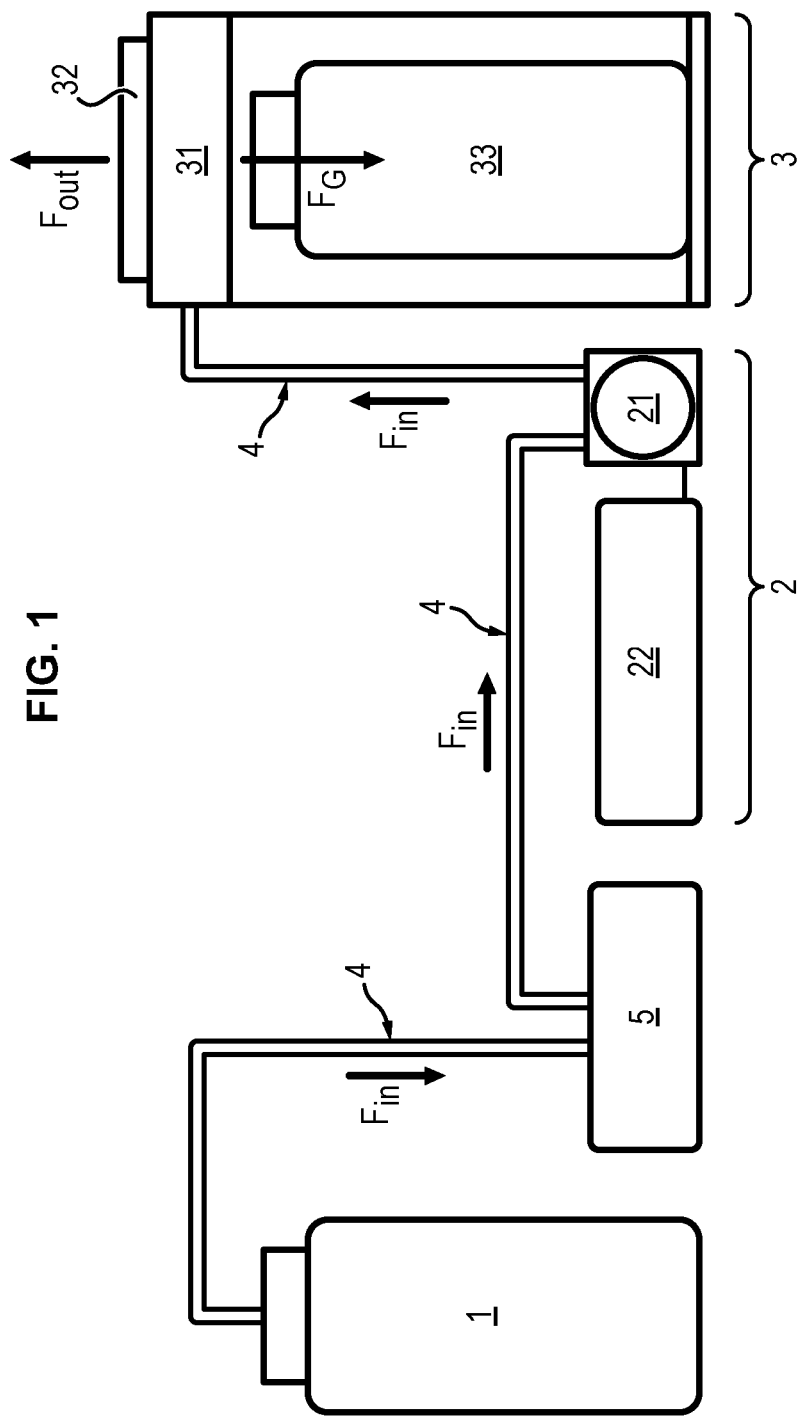

DEVICE AND METHOD FOR SIMULATION OF SURFACE BLEEDINGS

FIELD OF THE INVENTION

The invention relates to the medical field and more particularly the assessment of the severity of a surface bleeding, for example to determine the efficacy of a hemostatic agent on a wound.

TECHNICAL BACKGROUND

Assessment of the efficacy of a product, in particular a medical product, is meaningful when the protocol for validating one particular product is reliable and repeatable in a consistent and comparable manner.

Such reliable and repeatable protocols are however not always available. For instance, the evaluation of the hemostatic performance of a product is very difficult as there is no method available for consistent assessment of the bleeding severity of wounds. In addition, there is no method available that would be applicable to any surgical procedure for use for example in a clinical investigation assessing the performance of the hemostatic agent.

An estimate of total intraoperative blood loss is an integral part of any surgical procedure and is considered routine care. The wide variety of surgical specialties and operations make quantitative standardization of total blood loss difficult, yet estimates may still be provided. Estimating total blood loss during a surgical procedure, supplemented with other variables such as blood pressure, are data helpful for the ongoing evaluation of the condition of a subject and the assessment/modification of intra- and post-operative management.

Adams et al. have described a sketched scale in the publication entitled "Acute in-vivo evaluation of bleeding with Gelfoam plus saline and Gelfoam plus human thrombin using a liver square lesion model in swine" (J Thromb Thrombolysis. 2009 July; 28(1):1-5. doi: 10.1007/s11239-008-0249-3. Epub 2008 July 16) used for assessing hemostasis or residual bleeding after placement of a product, in particular Gelfoam (which is produced by Baxter). There is however no indication of how bleeding severity is established during intra-operative inclusion/exclusion assessment before randomization, in particular before investigational device placement. Such scale further appears not to be adapted to be used consistently to assess success/failure of a product vs. hemostasis. This proposed scale does not include the full range of potential input and output domain data values for each proposed site, e.g. it does not include or distinguish life threatening as well as severe bleeding.

There does not appear to be correlation of the amount of blood associated with any score at any site to an objective measure of this amount of blood, e.g. weight of blood loss over a pre-specified time. There is thus a need for a score representative of a comparable amount of blood mass or flow across the various anatomic sites and under various potentially significant conditions (covariates).

A goal of the invention is to propose a system and method to simulate surface bleedings and validate a bleeding severity assessment scale for further application, during surgery and/or in clinical trials for example.

A goal of the invention is in particular to provide a method that enables establishing a bleeding severity during intra-operative inclusion/exclusion assessment before randomization and investigational device placement.

Another goal of the invention is to provide a surface bleeding severity scale to be used for the consistent assessment of hemostatic success or failure. It would preferably include the full range of any potential input and output domain data values expected for bleeding severities seen during elective surgical procedures.

A further goal of the invention is to provide a system and method to create a surface bleeding model allowing for consistency in the assessments of success/failure of hemostasis, while not being dependent on an individual animal physiology.

Still another goal of the invention is to provide a system and method to ensure consistency of bleeding severity assessments across investigators testing a particular product, in particular in a clinical investigation, to ensure notably that similar bleeding severities are enrolled during the investigation.

A specific goal of the invention is to provide a system and method to be used during a clinical study of a hemostatic product, in particular to determine intraoperative eligibility of patients, as well as hemostatic success of the tested product. In particular a goal is to ensure consistent enrollment of target bleeding sites of bleeding severities to be treated for assessment of the hemostatic product under investigation and help ensure subject safety by excluding those who have a too severe bleeding.

Still another goal on the invention is to provide a system and method to help training and testing investigators to recognize a specific degree of surface bleeding and homogeneously assess such surface bleeding in a clinical investigation.

SUMMARY OF THE INVENTION

To this end, is proposed a device to simulate a surface bleeding and corresponding method as defined in the appended claims.

The following numbered examples describe features in accordance with various embodiments of the invention as further described above.

Example 1 relates to a device to simulate a surface bleeding, comprising:
  A source of a blood liquid, in particular a synthetic blood liquid or a blood liquid having been removed from a human body;
  A pump system connected to the source of blood liquid and configured to provide a controlled flow of said blood liquid;
  A wound simulator having an open chamber connected to the pump system to receive the controlled flow of blood liquid, wherein the wound simulator comprises a set of interchangeable plates,
    each plate having a plurality of holes arranged through said plate according to a specific pattern, wherein the specific pattern is different for each plate of the set of interchangeable plates, and
    each plate being adapted to be removably mounted on the wound simulator to close the open chamber, so that blood liquid flows out of the chamber through the holes of the plate mounted on the wound simulator.

Example 2 relates to the device of Example 1, wherein the plates of the set of interchangeable plates have holes arranged according to specific patterns of different surface areas, in particular of different sizes.

Example 3 relates to the device of any one of Examples 1 or 2, wherein the holes are provided in each of the interchangeable plates at a density of at least 50 holes/cm$^2$, and preferably of 100 holes/cm$^2$.

Example 4 relates to the device of any one of Examples 1 to 3, wherein the number and diameter of the holes provided in each of the interchangeable plates are set to reproduce the visual appearance of a bleeding surface.

Example 5 relates to the device of Example 4, wherein the holes provided in each one of the interchangeable plates have all the same diameter, preferably comprised between 0.2 mm and 1 mm, and most preferably of 0.5 mm.

Example 6 relates to the device of any one of Examples 1 to 5, wherein the holes provided in each one of the interchangeable plates are regularly spaced apart in the corresponding specific pattern, with a pitch preferably comprised between 0.4 mm and 2 mm, and most preferably of 1 mm.

Example 7 relates to the device of any one of Examples 1 to 6, wherein the wound simulator further comprises a gravity fed gutter system to drain out the blood liquid having passed through the holes of the plate and guide it into a receiving container.

Example 8 relates to the device of any one of Examples 1 to 7, further comprising a pressure monitoring system connected to the pump system to measure the pressure of the blood liquid supplied to the open chamber of the wound simulator.

Example 9 relates to the device of any one of Examples 1 to 8, wherein the pump system comprises a peristaltic pump provided with tubing for circulation of the blood liquid from the blood source to the open chamber.

Example 10 relates to the device of any one of Examples 1 to 9, wherein the pump system comprises a pump controller for control of the flow of the blood liquid from the blood source to the open chamber.

Example 11 relates to a method for simulating a plurality of different surface bleedings with for instance the device of any of Examples 1 to 10, wherein each surface bleeding is simulated by mounting on the wound simulator a specific plate chosen among the set of interchangeable plates, and adjusting the flow of blood liquid provided by the pump system to a specific value.

Example 12 relates to the method of Example 10, comprising the simulation of several sets of surface bleedings, wherein:
  a first set of surface bleedings is simulated to represent a first degree of severity of surface bleeding, each of the surface bleedings being simulated by adjusting the flow of the blood liquid provided by the pump system to a specific value being chosen superior to 0 mL/min and inferior to 4.8 mL/min;
  a second set of surface bleedings is simulated to represent a second degree of severity of surface bleeding, each of the surface bleedings being simulated by adjusting the flow of the blood liquid provided by the pump system to a specific value being chosen superior or equal to 4.8 mL/min and inferior to 12.0 mL/min.
  a third set of surface bleedings is simulated to represent a third degree of severity of surface bleeding, each of the surface bleedings being simulated by adjusting the flow of the blood liquid provided by the pump system to a specific value being chosen superior or equal to 12.0 mL/min and inferior to 25.3 mL/min.
  a fourth set of surface bleedings is simulated to represent a fourth degree of severity of surface bleeding, each of the surface bleedings being simulated by adjusting the flow of the blood liquid provided by the pump system to a specific value being chosen superior or equal to 25.3 mL/min and inferior to 102.0 mL/min.
  a fifth set of surface bleedings is simulated to represent a fifth degree of severity of surface bleeding, each of the surface bleedings being simulated by adjusting the flow of the blood liquid provided by the pump system to a specific value being chosen superior or equal to 102.0 mL/min.

Example 13 relates to the method of Example 10, comprising the simulation of several sets of surface bleedings, wherein:
  a first set of surface bleedings is simulated to represent a first degree of severity of surface bleeding, said first set of surface bleedings comprising
    at least one surface bleeding being simulated by mounting a plate with through holes arranged according to a pattern of 1 cm$^2$ and by adjusting the flow of the blood liquid provided by the pump system to a specific value being chosen superior to 0 mL/min and inferior to 4.8 mL/min;
    at least one surface bleeding being simulated by mounting a plate with through holes arranged according to a pattern of 10 cm$^2$ and by adjusting the flow of the blood liquid provided by the pump system to a specific value being chosen superior to 0 mL/min and inferior to 9.1 mL/min;
    at least one surface bleeding being simulated by mounting a plate with through holes arranged according to a pattern of 50 cm$^2$ and by adjusting the flow of the blood liquid provided by the pump system to a specific value being chosen superior to 0 mL/min and inferior to 13.5 mL/min;
  a second set of surface bleedings is simulated to represent a second degree of severity of surface bleeding, said second set of surface bleedings comprising
    at least one surface bleeding being simulated by mounting a plate with through holes arranged according to a pattern of 1 cm$^2$ and by adjusting the flow of the blood liquid provided by the pump system to a specific value being chosen superior or equal to 4.8 mL/min and inferior to 12.0 mL/min;
    at least one surface bleeding being simulated by mounting a plate with through holes arranged according to a pattern of 10 cm$^2$ and by adjusting the flow of the blood liquid provided by the pump system to a specific value being chosen superior or equal to 9.1 mL/min and inferior to 20.0 mL/min;
    at least one surface bleeding being simulated by mounting a plate with through holes arranged according to a pattern of 50 cm$^2$ and by adjusting the flow of the blood liquid provided by the pump system to a specific value being chosen superior or equal to 13.5 mL/min and inferior to 28.0 mL/min;
  a third set of surface bleedings is simulated to represent a third degree of severity of surface bleeding, said third set of surface bleedings comprising
    at least one surface bleeding being simulated by mounting a plate with through holes arranged according to a pattern of 1 cm$^2$ and by adjusting the flow of the blood liquid provided by the pump system to a specific value being chosen superior or equal to 12.0 mL/min and inferior to 25.3 mL/min;
    at least one surface bleeding being simulated by mounting a plate with through holes arranged according to a pattern of 10 cm$^2$ and by adjusting the flow of the blood liquid provided by the pump system to a specific value being chosen superior or equal to 20.0 mL/min and inferior to 71.3 mL/min;
at least one surface bleeding being simulated by mounting a plate with through holes arranged according to a pattern of 50 cm$^2$ and by adjusting the flow of the blood liquid provided by the pump system to a specific value being chosen superior or equal to 28.0 mL/min and inferior to 117.3 mL/min;
a fourth set of surface bleedings is simulated to represent a fourth degree of severity of surface bleeding, said fourth set of surface bleedings comprising
at least one surface bleeding being simulated by mounting a plate with through holes arranged according to a pattern of 1 cm$^2$ and by adjusting the flow of the blood liquid provided by the pump system to a specific value being chosen superior or equal to 25.3 mL/min and inferior to 102.0 mL/min;
at least one surface bleeding being simulated by mounting a plate with through holes arranged according to a pattern of 10 cm$^2$ and by adjusting the flow of the blood liquid provided by the pump system to a specific value being chosen superior or equal to 71.3 mL/min and inferior to 147.4 mL/min;
at least one surface bleeding being simulated by mounting a plate with through holes arranged according to a pattern of 50 cm$^2$ and by adjusting the flow of the blood liquid provided by the pump system to a specific value being chosen superior or equal to 117.3 mL/min and inferior to 192.7 mL/min;
a fifth set of surface bleedings is simulated to represent a fifth degree of severity of surface bleeding, said fifth set of surface bleedings comprising
at least one surface bleeding being simulated by mounting a plate with through holes arranged according to a pattern of 1 cm$^2$ and by adjusting the flow of the blood liquid provided by the pump system to a specific value being chosen superior or equal to 102.0 mL/min;
at least one surface bleeding being simulated by mounting a plate with through holes arranged according to a pattern of 10 cm$^2$ and by adjusting the flow of the blood liquid provided by the pump system to a specific value being chosen superior or equal to 147.4 mL/min;
at least one surface bleeding being simulated by mounting a plate with through holes arranged according to a pattern of 50 cm$^2$ and by adjusting the flow of the blood liquid provided by the pump system to a specific value being chosen superior or equal to 192.7 mL/min.

Example 14 relates to the method of any one of Examples 11 to 13, wherein each of the simulated surface bleedings is recorded as a video.

Example 15 relates to method of preparation of at least a training set of videos comprising the following subsequent steps:
Selecting a plurality of videos of simulated surface bleedings recorded for instance pursuant to the method of Example 14, wherein a score corresponding to a degree of severity of surface bleeding is affected to each one of the selected videos;
Classifying the selected videos in a specific order for visualization, wherein the score of each of the videos is to be displayed with the corresponding video.

Example 16 relates to the method of Example 15, wherein the videos are classified for visualization according an increasing or decreasing order of the corresponding degrees of severity of surface bleeding.

Example 17 relates to a method of preparation of at least a testing set of videos comprising the following subsequent steps:
Selecting a plurality of videos of simulated surface bleedings recorded for instance pursuant to the method of Example 14, wherein a score corresponding to a degree of severity of surface bleeding is affected to each one of the plurality of videos;
Classifying the videos in a random order for visualization, wherein the score of each of the videos is not to be displayed with the corresponding video.

Example 18 relates to a method of preparation of at least a training set of videos and at least a testing set of videos using a plurality of videos of simulated surface bleedings recorded for instance pursuant to the method of Example 14, wherein a score corresponding to a degree of severity of surface bleeding is affected to each one of the plurality of videos, comprising:
preparing the training set of videos by selecting some videos of the plurality of videos, and classifying the selected videos in a specific order for visualization, wherein the score and information on the specific chosen plate of each of the videos are to be displayed with the corresponding video;
preparing the testing set of videos by selecting some videos of the plurality of videos, and classifying the selected videos in a random order for visualization, wherein the score of each of the videos is not to be displayed with the corresponding video, and wherein the selection and/or classification of the videos is different from the training set of videos.

Example 19 relates to a method of training a person to recognize and classify a severity of a surface bleeding comprising the step of displaying a plurality of training videos in a specific order, wherein each one of the training videos shows a simulated surface bleeding and a score corresponding to the severity of said simulated surface bleeding.

Example 20 relates to the method of Example 19, wherein the training videos are displayed according to an increasing or decreasing order of the corresponding degrees of severity of surface bleeding.

Example 21 relates to the method of any one of Examples 19 or 20, comprising a subsequent step of testing the person in applying the following steps:
displaying in a random order a plurality of testing videos each numerically labeled in sequence, wherein each one of the testing videos shows a simulated surface bleeding without any score corresponding to the severity of said simulated surface bleeding of simulated surface bleeding, and wherein the testing videos are different from the training videos and/or used in a different order;
requesting the person to give for each of the testing videos a score representative of the severity of the corresponding surface bleeding in the order of the numerically labeled sequence.

Example 22 relates to a method of performing a clinical trial to assess hemostatic power of a product against surface bleeding, comprising the following steps:
a) characterizing the severity of a baseline surface bleeding from a wound of a patient by affecting a score, said characterization being for instance based on the training performed according to any one of Examples 19 to 21;

b) applying the product on the wound according to a specific protocol of use of the product;

c) at a predetermined time after step b), characterizing the severity of the remaining surface bleeding from the wound of the patient by affecting a score, said characterization being for instance based on the training performed according to any one of Examples 19 to 21.

Example 23 relates to the method of Example 22, wherein steps b) and c) are repeated several times after each characterization of the severity of the remaining surface bleeding in order to assess the hemostatic power of the product over time.

BRIEF DESCRIPTION OF THE DRAWINGS

Other characteristics and advantages of the invention will become clear from the following description which is only given for illustrative purposes and is in no way limitative and should be read with reference to the attached drawings on which:

FIG. 1 is a schematic representation of a device for simulating a surface bleeding;

DETAILED DESCRIPTION OF THE INVENTION

Figure 3:
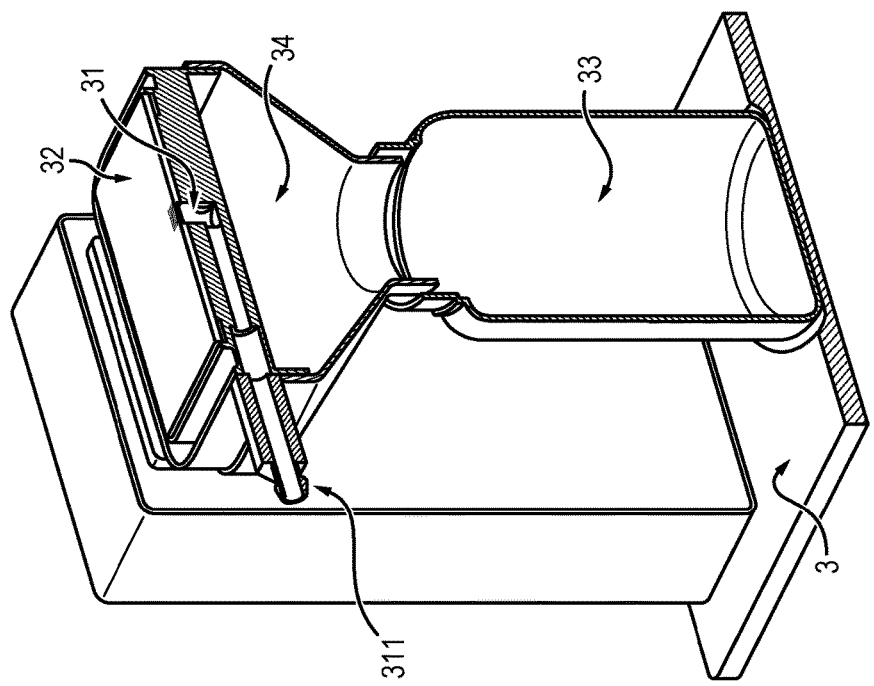
FIG. 3 is a perspective view illustrating a cross section of the wound simulator of FIG. 2.
Figure 2:
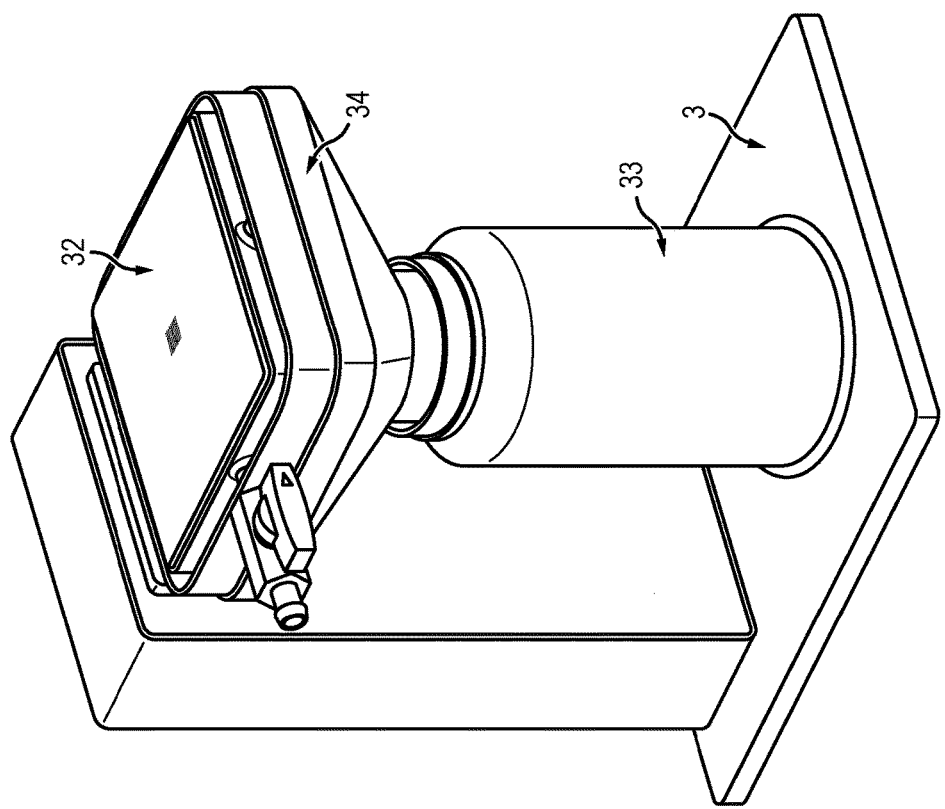
FIG. 2 is a perspective view of a wound simulator of the device illustrated in FIG. 1.

The following description is focused on the determination, recognition and assessment of a surface bleeding, in particular to determine the severity of such surface bleeding. All the corresponding teaching could however be applied to any secretion of body fluid, in particular any secretion of body fluid that has to be recognised and/or assessed for medical or scientific purposes, such as for example the bile.

Reliable and repeatable assessment of a surface bleeding needs establishment of a scale that enables recognition of the severity of the surface bleeding for any target bleeding site (TBS) that can be used similarly for any surgical specialties, i.e. independently from the consequence of the blood loss in such a specific surgical specialty.

Such scale—referred to SBSS for Surface Bleeding Severity Scale—will enable a consistent assessment of bleeding that is applicable to any surgical procedure, to be used for instance in a clinical investigation assessing the performance of a medical product, such as a hemostatic agent.

In the case of a hemostatic agent, the goal is to ensure that the hemostat is applied when control of bleeding by conventional procedures is ineffective or impractical and to allow severity of bleeding to be chosen for designed efficacy of a hemostatic product.

It is also important to ensure consistency of bleeding severity assessments across investigators and that only eligible bleeding severities are enrolled during a clinical trial.

Device for Simulation of a Surface Bleeding

For building such a scale to assess the severity of intraoperative bleeding at a target bleeding site (TBS), it is proposed to use a device to simulate a surface bleeding, thus creating a bench-top bleeding model.

Specific use of this bench-top bleeding model enables simulating several chosen types of bleeding so that a scale of surface bleeding severity is built for later assessment by surgeons of a surface bleeding in a target bleeding site.

Moreover, the specific device to simulate a surface bleeding enables establishing a correspondence between constant blood flow rate (and resulting blood volume in a defined period of time) and the developed surface bleeding severity scale.

Thanks to such surface bleeding simulating device, it is possible to train and test surgeons for assessment of any surface bleeding. In particular, this will be useful to train and test a surgeon investigator that would have to assess a surface bleeding for testing a hemostatic product for instance.

More generally, the surface bleeding simulating device helps people, in particular surgeons, to learn how to assess the severity of surface bleeding in any surgical situation, independently from the individual animal physiology.

As illustrated in FIG. 1, the proposed device for simulating a surface bleeding comprises a source 1 of a blood liquid. Such blood liquid can be a synthetic blood liquid, a blood liquid having been removed from a human body, or any other liquid suitable to mimic blood.

One can for instance use the synthetic blood liquid commercialized by Jeulin, a company located in France, under the reference "Sang synthétique—ref: 107175". This synthetic blood has the advantages of having the similar color and viscosity as human blood, while being easily washable.

In the synthetic blood, one can preferably add between 1% and 30% by weight, and more preferably between 2% and 15% by weight, of a surfactant to adapt surface tension of the synthetic blood and to enable homogeneous flow in the device. One example of surfactant that can be used is the product commercialized by Procter&Gamble under the trade name "Fairy Original" with the product code PA00168831. Such surfactant comprises from 20% to 30% of a mixture of Alcohols, C10-16, ethoxylated, sulfates, sodium salts, and from 5% to 10% of a mixture of Amines, C10-16-alkyldimethyl, N-oxides.

When it is chosen to use blood liquid having been removed from a human body, it will be preferably treated to avoid coagulation, by using for example Ethylenediaminetetraacetic acid (EDTA) or citrate.

Preferably, the temperature of the blood liquid is controlled to be at a temperature close to the human body temperature, i.e. around 37° C. Alternatively, the simulation can be done at room temperature, i.e. the blood liquid is at a temperature between 20° C. and 25° C.

The simulating device further comprises a pump system 2 connected to the source 1 of blood liquid via a specific tubing system 4.

This pump system 2 is configured to provide a controlled flow $F_{in}$ of said blood liquid. Preferably the pump system 2 is adapted for providing a pulsated flow of blood liquid.

Preferably, the pump system 2 comprises a peristaltic pump 21 provided with the tubing 4 necessary for circulation of the blood liquid from the blood source 1 at the required flow rate $F_{in}$.

The pump system 2 may also preferably include a pump controller 22 for full control of the flow of blood liquid within the tubing 4 of the simulating device, in particular, the volume, flow rate, direction of the blood liquid.

The flow $F_{in}$ of the blood liquid can be controlled to vary regularly, preferably with increments of at least 0.1 mL/min.

The tubing 4 is adapted to the flow range for which the pump system is intended to be used.

Preferably, the pump system 2 and corresponding tubing 4 are adapted for flow up to 500 mL/min, and most preferably up to 250 mL/min.

One could for instance use a pump system of the Allegro™ family, commercialized by KD Scientific, which combines a peristaltic pump system with a controller unit.

According to a specific embodiment, the tubing 4 is specifically chosen depending on the flow rate that is to be used. For example, a first set of tubing 4 can be used for any flow rate up to 60 mL/min, whereas a second set of tubing 4 is used for any flow rate above 60 mL/min. For instance, silicon tubes commercialized under the reference "Masterflex® L/S® 14" could be used for flow rates up to 60 mL/min, and silicon tubes commercialized under the reference "Masterflex® L/S® 25" could be used for flow rates above 60 mL/min.

The simulating device further comprises a wound simulator 3 having an open chamber 31 connected to the pump system 5 to receive the controlled flow $F_{in}$ of blood liquid.

The wound simulator 3 comprises a set of interchangeable plates 32 wherein each plate 32 is adapted to be removably mounted on the wound simulator 3 to close the open chamber 31.

Figure 5:
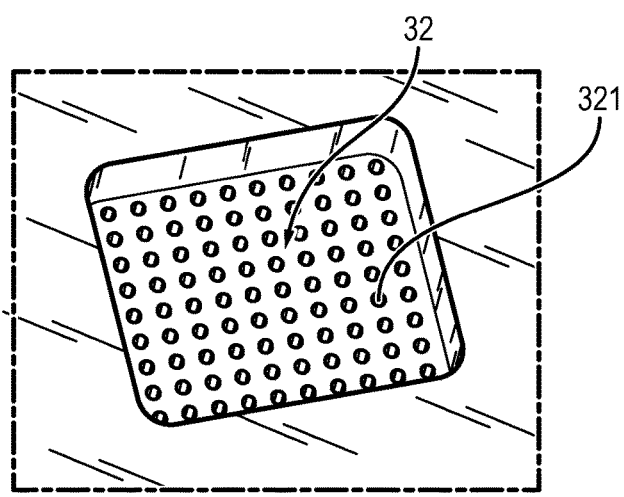
FIG. 5 is an enlarged perspective view of one interchangeable plate of the wound simulator of FIG. 2.

As illustrated in FIG. 5, each plate 32 has preferably a plurality of holes 321 arranged through said plate 32 according to a specific pattern.

As a consequence, the blood liquid entering the chamber 31 via the fluid inlet 311, at a specific flow $F_{in}$ controlled by the pump system 2, flows out of the chamber 31 through the holes 321 of the plate 32 mounted on the wound simulator 3 (see flow $F_{out}$ on FIG. 1).

The blood liquid flowing out of the holes 321 of the plate 32 mimics a surface bleeding, wherein the intensity of the simulated bleeding depends on several parameters as for instance the controlled flow $F_{in}$ of the blood liquid and the arrangement of the holes 321 through the plate 32.

Preferably, the specific pattern of arrangement of the through holes 321 is different for each plate 32 of the set of interchangeable plates. This enables simulating different bleeding surface areas that could correspond to standard target bleeding sites that a surgeon may come across during a surgery.

The patterns of arrangement are said to be different from one another for instance if they have different shapes (square, rectangular, circular or any other more complex shape), if they have different sizes, and/or if the through holes 321 that are provided have different dimensions.

FIGS. 6a, 6b, 7a, 7b, 8a and 8b illustrate for instance three different plates 32 included in a set of plates, where the holes 321 are arranged according to three different patterns P1, P2, and P3 respectively. In this case, the patterns differ from one another in that they have different sizes.

Preferably, the density and diameter of the holes 321 provided in each of the interchangeable plates are set to mimic the visual appearance of a bleeding surface.

In particular, the holes can be provided in each of the interchangeable plates at a density of at least 50 holes/cm$^2$, and preferably a density of 100 holes/cm$^2$.

The diameter of the through holes 321 can be constant, for instance comprised between 0.2 mm and 1 mm, and is most preferably of 0.5 mm. A diameter of 0.5 mm for the hole is indeed preferred as it represents the typical size of small blood vessels.

The holes 321 provided may be regularly spaced apart in the corresponding specific pattern, with a pitch preferably comprised between 0.4 mm and 2 mm, and most preferably of 1 mm.

In the specific embodiments of the plates illustrated in FIGS. 6a, 6b, 7a, 7b, 8a and 8b, the through holes 321 have all the same diameter of 0.5 mm, and are regularly spaced apart (pitch of 1 mm/density of 100 holes/cm$^2$) according to a square pattern. The only difference between the three plates of these embodiments is the size of the area of the square pattern.

Figure 6A:
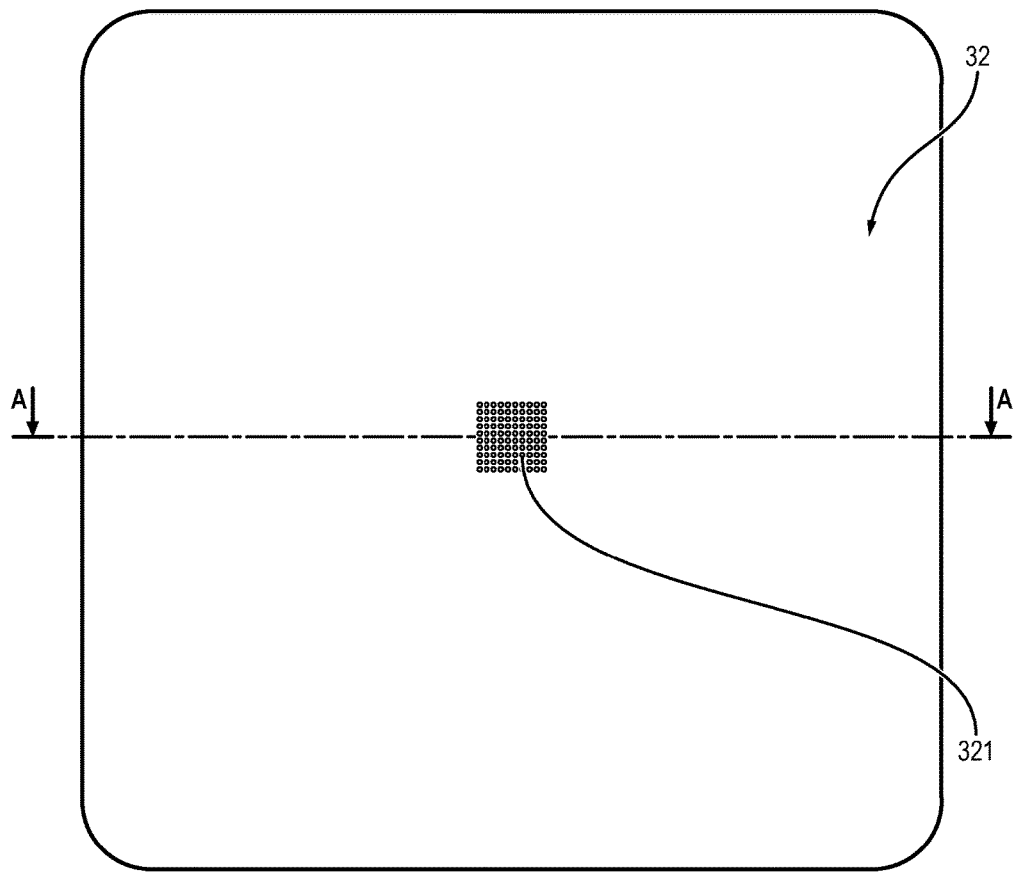
FIG. 6a is an upper view of an interchangeable plate according to a first embodiment.
Figure 6B:
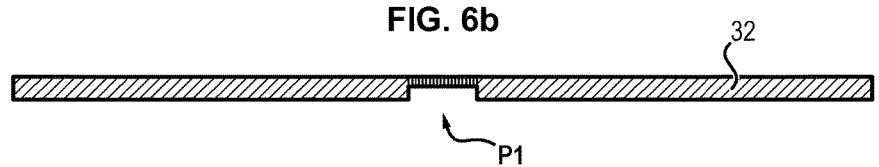
FIG. 6b is a cross-section view of the interchangeable plate of FIG. 6a along line A-A.

The plate 32 of FIGS. 6a and 6b corresponds to the plate with the so-called small pattern, the pattern being a square of 1 cm$^2$. Such plate comprises 100 holes of a 0.5 mm diameter.

Figure 7A:
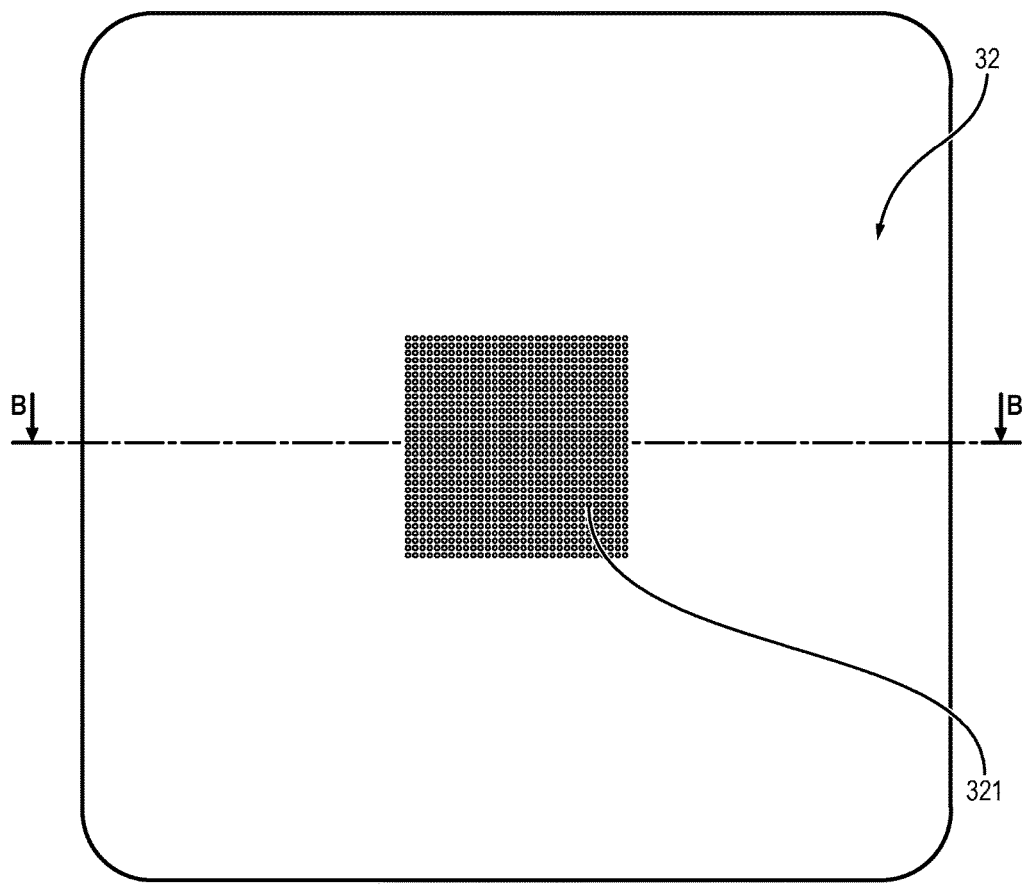
FIG. 7a is an upper view of an interchangeable plate according to a second embodiment.
Figure 7B:
FIG. 7b is a cross-section view of the interchangeable plate of FIG. 7a along line B-B.

The plate 32 of FIGS. 7a and 7b corresponds to the plate with the so-called medium pattern, the pattern being a square of 10 cm$^2$. Such plate comprises around 1000 holes (more precisely 961 holes) of a 0.5 mm diameter.

Figure 8A:
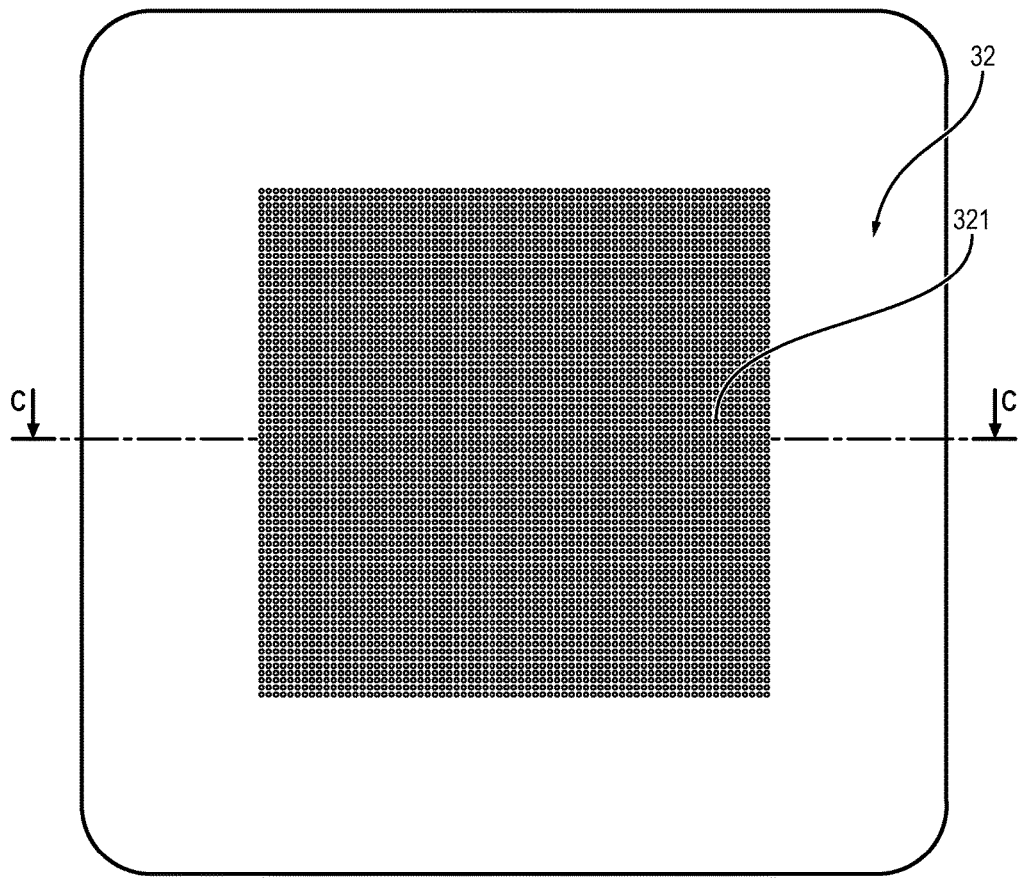
FIG. 8a is an upper view of an interchangeable plate according to a third embodiment.
Figure 8B:
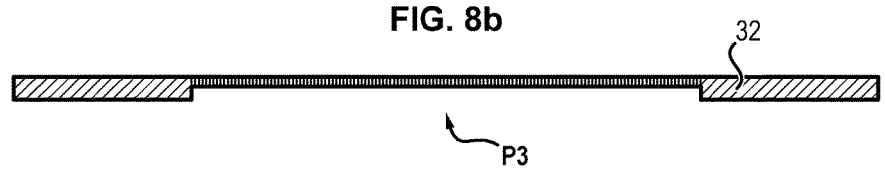
FIG. 8b is a cross-section view of the interchangeable plate of FIG. 8a along line C-C.

The plate 32 of FIGS. 8a and 8b corresponds to the plate with the so-called large pattern, the pattern being a square of 50 cm$^2$. Such plate comprises around 5000 holes (more precisely 5041 holes) of a 0.5 mm diameter.

This specific set of interchangeable plates 32 is especially preferred for the simulation of surface bleeding as it corresponds to the size of several different wounds which will enable having representative data to build a surface bleeding scale.

Other examples of possible plates to be used alone or in combination of the above mentioned plates to form a set of plates are the following:
 a plate with a square pattern of 5 cm$^2$, comprising around 500 holes of a 0.5 mm diameter;
 a plate with a square pattern of 20 cm$^2$, comprising around 2000 holes of a 0.5 mm diameter;
 a plate with a square pattern of 50 cm$^2$, comprising around 200 holes of a 0.5 mm diameter.

Preferably the holes 321 are drilled in the plates 32 according to the required pattern.

The plates are preferably made in a material chosen so that the corresponding surface tension participates to the homogeneous surface flow of the blood liquid passing through the holes, thereby simulating an homogeneous bleeding.

When a surfactant is used in a synthetic blood liquid, the quantity thereof is preferably controlled depending on the hydrophobic features of the material, and thus on the surface tension resulting from the chosen material.

The plates 32 may for example be made of acrylic, plexiglass, or Polymethyl-methacrylate (PMMA).

Alternatively or additionally, the plates 32 may be formed in a material having a specific porosity so that liquid can pass through the plate. The porosity is chosen so that it opposes a resistance to the passage of fluid, in order to mimic the capillarity of a surface vessel, vein, or artery.

Preferably the color of the plates is also chosen specifically depending of the surface bleeding which is to be simulated. For instance, for simulating a surface bleeding from an organ (e.g. the liver), the plates are preferably colored in red, or made in a material being red. For simulating a bleeding from a bone, a white plate could be used. For simulating a bleeding from fat, a yellow plate could be used. More generally, the plate could have the color of the targeted tissue.

In a preferred embodiment, the color of the plates is chosen to mimic the worst case-scenario that could happen in a surgery in terms of contrast between the blood and the bleeding surface (for instance a bleeding from the liver where the contrast is low). In such case, the plates are thus preferably colored in red, or made in a material being red.

Figure 4:
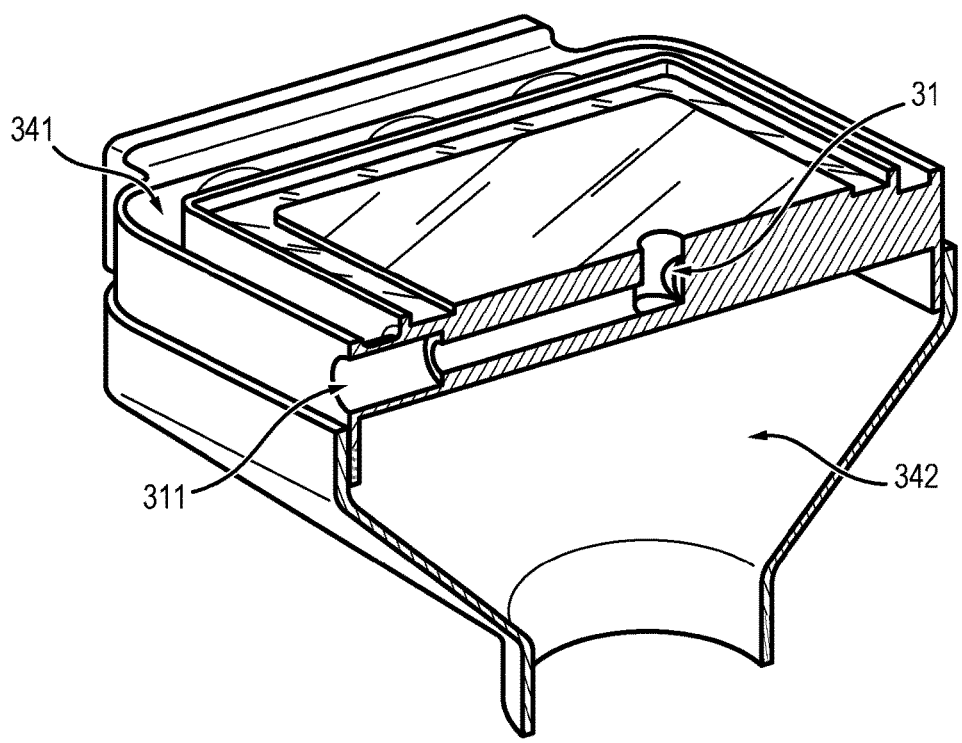
FIG. 4 is an enlarged perspective view in cross-section of the open chamber and gutter system of the wound simulator of FIG. 3.

Preferably, the wound simulator 3 further comprises a gutter system 34 to drain out the blood liquid having passed through the holes 321 of the plate 32. This gutter system can be an overflow gutter 341 as illustrated in FIG. 4.

The gutter system 34 is preferably designed to guide the blood liquid from the plate 32 into a receiving container 33, which is for instance placed in the wound simulator 3 under the open chamber 31, such that it is fed by gravity (see flow $F_G$ on FIG. 1). In this case, the gutter system 34 can comprise a funnel-shaped element 342, which is for instance vacuum formed.

The receiving container 33 may for example comprise a wide neck return bottle, that can be made in high density polyethylene (HDPE).

The volume of the receiving container 33 is preferably chosen to be large enough to avoid having to change it during the simulation of one particular surface bleeding. Preferably, the receiving container 33 has a volume of at least 1 L.

In another embodiment, the receiving container 33 is connected to the source 1 of blood liquid so as to form a closed loop for the blood liquid to circulate within the simulating device. In such case, filter means are preferably interposed between the receiving container 33 and the source 1 of blood liquid to remove any impurities that could have polluted the blood liquid having passed through the holes 321 of the plate 32.

According to one specific embodiment, most of the elements forming the wound simulator 3 are made in polycarbonate. A support structure manufactured in aluminium can in this case be provided to stabilize the wound simulator.

The device for simulating surface bleedings can also include a pressure monitoring system 5 connected to the pump system 2 to measure the pressure of the blood liquid supplied to the open chamber 31 of the wound simulator 3. The pressure monitoring system 5 enables controlling that the flows of blood liquid used for surface bleeding simulations remain at physiologic ranges of pressure.

Such device is very advantageous for simulating several types of surface bleedings, and for consequently building a corresponding scale to enable sorting surface bleedings depending on their severity as assessed by surgeons of reference.

In particular, a plurality of different surface bleedings can be simulated with such device by mounting on the wound simulator 3 a specific plate 32 chosen among the set of interchangeable plates and adjusting the flow of blood liquid provided by the pump system 2 to a specific value.

Method for Building a Surface Bleeding Severity Scale

Below is described one specific method for building a surface bleeding severity scale by using the above described simulating device.

First, easy-to-understand commonly used terms to qualify and describe the severity of surface bleedings have been selected to create the following qualitative 6-point ordinal scale for surface bleeding:

0—No bleeding/hemostasis
1—Minimal bleeding
2—Mild bleeding
3—Moderate bleeding
4—Severe bleeding
5—Extreme bleeding In addition to those verbal descriptors of the surface bleedings, a visual descriptor has been assigned for each of the scores of the scale, as well as an expected intervention for a surgeon. Table 1 below summarizes the features of the proposed surface bleeding scale.

TABLE 1

| | Surface Bleeding Severity Score | | | | | |
|---|---|---|---|---|---|---|
| | 0 | 1 | 2 | 3 | 4 | 5 |
| Verbal Descriptor of the bleeding | None | Minimal | Mild | Moderate | Severe; not immediately life-threatening | Extreme; immediately life-threatening |
| Visual Descriptor of the bleeding | Dry | Oozing | Pooling | Flowing | Streaming | Gushing |
| Expected Intervention(s) | None | Manual pressure, cautery, adjuvant hemostat(s) | Manual pressure, cautery, suture, adjuvant hemostat(s) | Manual pressure, cautery, suture, adjuvant hemostat(s) | Manual pressure, cautery, suture, staples, tissue repair | Manual pressure, cautery, suture, staples, tissue repair |
| Maximum Expected ACS-ATLS Shock Risk Class | 1 | 1 | 1 | 2 | 3 | 4 |

In the above table, the Shock Risk scale of ACS-ATLS (American College of Surgeons—Advanced Trauma Life Supports) is defined as follows:

Class 1: involves up to 15% of blood volume; typically no charge in vital signs and fluid resuscitation is not usually necessary.

Class 2: involves 15-30% of total blood volume; patient is often tachycardic with a narrowing of the difference between the systolic and diastolic blood pressures; the body attempts to compensate with peripheral vasoconstriction; skin may start to look pale and be cool to the touch; volume resuscitation with crystalloids is all that is typically required; blood transfusion is not typically required.

Class 3: involved loss of 30-40% of circulating blood volume; patient's blood pressure drops; heart rate increases, peripheral hypoperfusion worsens; fluid resuscitation with crystalloid and blood transfusion are usually necessary.

Class 4: involves loss of more than 40% of circulating blood volume; the limit of the body's compensation is reached and aggressive resuscitation is required to prevent death.

The above SBSS scale can be used to define whether or not a bleeding is eligible for an investigation trial, depending on the alleged efficacy of the product to be tested.

Based on surgeon key opinion leaders (KOL) feedback, life-threatening bleeding (score of 4 or 5) is applicable for trauma surgeries or battlefield wounds and would thus usually not be included in clinical investigation of a hemostatic product as an eligible bleeding site. Flow rates for a surface bleeding severity score of 5 do reflect life-threatening bleeding, but it would be highly unlikely that this level of bleeding would ever be seen in elective surgical cases. In fact, surgeon key opinion leaders also suggested that surface bleeding severity scores 4 and 5 are infrequent occurrences for elective cases.

After having defined such a qualitative scale, the simulating device can be used to determine thresholds for the flow rates of the blood liquid corresponding to each one of the scores of the surface bleeding severity scale. This enables building a quantitative definition in addition to the qualitative definition above.

To this end, a surgeon will assess the bench-top model under each of the three target bleeding sites (TBS) scenarios, i.e. by using each of the above described TBS plates with reference to FIGS. 6a, 6b, 7a, 7b, 8a and 8b.

Establishing the relationship between the scores of the surface bleeding severity scale and flow rates of the blood liquid in the simulating device will for example proceed in two steps.

First, the surgeon will observe a continuous slowly increasing inflow rate and will identify likely targets for thresholds of the surface bleeding scoring system.

After these initial thresholds are identified, the surgeon will then refine the definition of the scoring system by observing 10 bleeding scenarios at uniformly distributed increments of flow rate within each initially defined interval.

For example, during the initial observation of the continually increasing pump flow rate, the surgeon may identify the following thresholds as likely candidates for changes in the SBSS: 0, 1.0 ml/min, 3.0 ml/min, 5.0 ml/min, 15.0 ml/min, and 50.0 ml/min.

Following this, the surgeon will observe 10 equally distributed pump flow rates within each initially identified interval.

In the context of the hypothetical example above, for the interval (0 ml/min and 1.0 ml/min], the surgeon will observe simulated bleeds at each increment of 0.1 ml/min from 0 ml/min to 1.0 ml/min.

Thus there will be a total of 50 incremental scorings (10 for each of the 5 initially defined intervals).

At each increment the following steps can be used in the scoring process:

Step 1: The surgeon begins with a clean surface.
Step 2: Blood flow begins at the given flow rate.
Step 3: The surface is wiped clean, while the pump continues to flow at the given rate.
Step 4: After observing the blood flow from the newly cleaned surface during a certain amount of time (e.g. from 1 second to 60 seconds, and preferably during at least 10 seconds), the surgeon assigns one of the defined score of the surface bleeding severity scale.

When it is desired to check if the out-flow rates are well correlated with the in-flow rates, one can also perform the following additional steps:

Step 5: The surface is wiped clean, while the pump continues to flow at the given rate.
Step 6: Immediately following the cleaning, a 4×4 inch stack of pre-weighed gauze is applied to the surface and kept in place for 5 seconds.
Step 7: Immediately after the gauze is removed, it is weighed to determine post-bleed weight and determine the out-flow rate.

To check if out-flow rates are well correlated with the in-flow rates, one can then measure, for each in-flow rate and TBS plate combination considered, the out-flow rate obtained from the weighing of the gauze immediately following the time that the surface bleeding severity score was assigned by the surgeon (step 7).

By subtraction of initial gauze stack, weight of blood alone is obtained which when combined with area and time of gauze application will provide a measurement of bleeding out-flow rate. Each out-flow measurement is then regressed against the in-flow rate using a linear regression model and the correlation coefficient and corresponding 95% confidence interval is reported.

Because the flow rate on the pump in this scenario is monotonically increased, the resulting refined surface bleeding severity scores will reflect a 6-interval partition of the flow rate range with each partition corresponding to a given surface bleeding severity score.

In the entire description, the notations of any range—also called interval—follow the following rules:

a range noted [x;y] means that both values x and y are included in the range;
a range noted ]x;y[ means that both values x and y are excluded from the range;
a range noted ]x;y] means that value x is excluded from the range whereas value y is included in the range;
a range noted [x;y[ means that value x is included in the range whereas value y is excluded from the range.

The entire procedure outlined above is then repeated for each of the three TBS scenarios, thus resulting in a total of 50 scorings and 50 observed outflow gauze weights for each scenario.

The surgeon performing the whole procedure can then define a flow rate range for each of the TBS plates, thus establishing a relationship between the input flow rate of the blood liquid (possibly corrected depending on the results of the correlation with the output flow) and each of the scores defining the surface bleeding severity scale (6 discrete scores in the example above).

These ranges for each of the TBS plate can be used as such.

Table 2 below gives a first example (Example A) intervals defined by the expert surgeon performing the procedure, depending on the TBS plates used.

TABLE 2

| Example A | TBS | Flow rates (mL/min) intervals associated to | | | | | |
|---|---|---|---|---|---|---|---|
| | | Score 0 | Score 1 | Score 2 | Score 3 | Score 4 | Score 5 |
| Final intervals by surface area | 1 cm² | 0 | ]0; 0.9[ | [0.9; 5.6[ | [5.6; 13.0[ | [13.0; 70.0[ | [70.0; +∞[ |
| | 10 cm² | 0 | ]0; 1.5[ | [1.5; 5.5[ | [5.6; 13.0[ | [13.0; 70.0[ | [70.0; +∞[ |
| | 50 cm² | 0 | ]0; 12.0[ | [12.0; 25.0[ | [25.0; 50.0[ | [50.0; 166.0[ | [166.0; +∞[ |

Table 3 below gives a second example (Example B) of intervals defined by the expert surgeon performing the procedure, depending on the TBS plates used.

TABLE 3

| Example B | TBS | Flow rates (mL/min) intervals associated to | | | | | |
|---|---|---|---|---|---|---|---|
| | | Score 0 | Score 1 | Score 2 | Score 3 | Score 4 | Score 5 |
| Final intervals by surface area | 1 cm² | 0 | ]0; 4.8[ | [4.8; 12.0[ | [12.0; 25.3[ | [25.3; 102.0[ | [102.0; +∞[ |
| | 10 cm² | 0 | ]0; 9.1[ | [9.1; 20.0[ | [20.0; 71.3[ | [71.3; 147.4[ | [147.4; +∞[ |
| | 50 cm² | 0 | ]0; 13.5[ | [13.5; 28.0[ | [28.0; 117.3[ | [117.3; 192.7[ | [192.7; +∞[ |

According to another embodiment, the interval thresholds corresponding to each surface bleeding severity score are averaged across the three TBS scenarios. This enables defining a single relationship between flow rate and the surface bleeding severity score across all TBS scenarios.

For example, supposing that the resulting flow rate interval corresponding to a surface bleeding severity score of 1 is ]x1 ml/min, y1 ml/min[, ]x2 ml/min, y2 ml/min[, and ]x3 ml/min, y3 ml/min[, within the 1, 10, and 50 cm² TBS scenarios, respectively. Then the final resulting flow rate interval for a SBSS of 1 will be ](x1+x2+x3)/3 ml/min, (y1+y2+y3)/3 ml/min[. The result of this averaging can define a single surface bleeding severity score system that could be applied across all TBS scenarios in subsequent phases of a medical investigation.

In case the procedure is performed by several expert surgeons, intervals could also be averaged based on the intervals defined by each expert surgeon for each severity score for each plate.

According to another embodiment, the expert surgeon determines and defines the intervals for one of the TBS plate, those intervals being then processed to derive the corresponding intervals for the other TBS plates depending on the pattern of holes for the TBS plate. The intervals are thus normalized for each of the surface area of the TBS plate used for the experiment.

Table 4 below gives an example of normalized intervals assigned to different TBS plates, those normalized intervals being also derived from the intervals defined for the 1 cm² TBS plate. In this third example (Example C), the intervals with values rounded to the above superior unit are assigned to the TBS plate of 1 cm² and the intervals for the other TBS plates are calculated taking into account the enlargement of the surface area compared to the 1 cm² TBS area. The normalization factor is given by the formula 1+2%*[percentage_of_enlargement] and the final limit of the intervals corresponds to the factorized value rounded to the above superior unit.

TABLE 4

| Example C | TBS | Flow rates (mL/min) intervals associated to | | | | | |
|---|---|---|---|---|---|---|---|
| | | Score 0 | Score 1 | Score 2 | Score 3 | Score 4 | Score 5 |
| Intervals defined by expert surgeon for 1 cm² TBS | | 0 | ]0; 4.8[ | [4.8; 12.0[ | [12.0; 25.3[ | [25.3; 102.0[ | [102.0; +∞[ |
| Final normalized intervals by surface area | 1 cm² | 0 | ]0; 5[ | [5; 12[ | [12; 26[ | [26; 102[ | [102; +∞[ |
| | 10 cm² | 0 | ]0; 6[ | [6; 15[ | [15; 31[ | [31; 123[ | [123; +∞[ |
| | 50 cm² | 0 | ]0; 10[ | [10; 24[ | [24; 51[ | [51; 204[ | [204; +∞[ |

Fixing the intervals corresponding to each of the scores of the surface bleeding scale, possibly depending on the TBS plate used in the simulating device, gives a quantitative final definition of the surface bleeding severity scale that can be simulated in the simulating device.

Learning of the Surface Bleeding Severity Scale

As mentioned, the simulating device enables simulation of specific surface bleeding at given flow rate in a precise and repeatable manner, which is very advantageous as it will help surgeons/investigators to be trained and tested to learn the specifically defined surface bleeding severity scale.

In particular, the device for simulating the surface bleeding can be used to create training and/or testing videos of bleeding scenarios across the range of surface bleeding severity values as defined previously for each TBS plate.

According to a non-limitative example, for each TBS scenario, two videos are created for each of five flow rates uniformly distributed within the interval partition defining each surface bleeding severity value.

For example, if the flow rate interval corresponding to a surface bleeding severity value of 3 is defined to be [3.0 ml/min, 5.0 ml/min[, two separate videos of surface bleedings at each flow rates of 3.4, 3.8, 4.2, 4.4, and 4.6 ml/min are made for each TBS scenario.

The procedures for recording the video sessions can be similar as the scoring process given above (Step 1 to Step 4). Specifically, the video will begin when blood begins to flow at Step 2 and will continue to run through Step 4. In a preferred embodiment, the video recording of Step 4 following the clean wiping of the TBS surface of Step 3 is done during a period of time between 12 seconds and 20 seconds. The relevant part of the video for assessment of the surface bleeding severity score corresponds in this case to the first 10 seconds following the clean wiping of the TBS surface of Step 3.

The videos for the surface bleeding severity score of 0 (complete hemostasis) are made by considering 5 scenarios within each TBS scenarios. The 5 scenarios aim at depicting differing flow rates prior to achieving hemostasis. In particular, the midpoint of the flow rate interval for each surface bleeding severity score ranging from 1 to 5 is considered.

For example, if the flow rate interval corresponding to a surface bleeding severity score of 3 is defined to be [3.0 ml/min, 5.0 ml/min[, we consider an initial flow rate of 4.0 ml/min. In this case, the video begins at Step 2 defined above when blood begins to flow at a flow rate of 4.0 ml/min. Prior to the surface being wiped clean in Step 3, the pump is turned off (flow rate of 0.0 ml/min), and the video continues to run for at least another 10 seconds, preferably between 12 seconds and 20 seconds. Again, the relevant part of the video for assessment of the surface bleeding severity score corresponds to the first 10 seconds following the clean wiping of the TBS surface of Step 3.

With such an example of procedure, a total of 180 videos are created corresponding to two replicates at each of 5 flow rates for each of the 6 surface bleeding severity scores, across the 3 TBS scenarios (2×5×6×3=180).

The first set of replicates can serve as the training pool from which a training sample is created, while the second set of replicates serves as a test pool from which the test sample is created. Alternatively, only one pool of videos is recorded, which will be used both in the training sessions and in the test sessions.

Consequently, to prepare for the training and/or testing of the surgeons/investigators that have to learn the surface bleeding severity scale (for example to be part of a medical investigation to assess an hemostatic product), several sets of surface bleedings are simulated—and preferably at least partially recorded as a video—with the above described simulating device, wherein a set of surface bleedings is simulated for each degree of severity of surface bleeding, based on the surface bleeding severity scale, depending on the ranges of blood flow rates defining each score of the surface bleeding severity scale.

For example, based on the surface bleeding severity scale as defined by the averaged intervals above, several sets of surface bleedings are simulated—and preferably at least partially recorded as a video—with the above described simulating device, wherein:
  a first set of surface bleedings is simulated to represent a first degree of severity of surface bleeding, each of the surface bleedings being simulated by adjusting the flow of the blood liquid provided by the pump system 2 to a specific value being chosen superior to 0 mL/min and inferior to 4.8 mL/min;
  a second set of surface bleedings is simulated to represent a second degree of severity of surface bleeding, each of the surface bleedings being simulated by adjusting the flow of the blood liquid provided by the pump system 2 to a specific value being chosen superior or equal to 4.8 mL/min and inferior to 12.0 mL/min;
  a third set of surface bleedings is simulated to represent a third degree of severity of surface bleeding, each of the surface bleedings being simulated by adjusting the flow of the blood liquid provided by the pump system 2 to a specific value being chosen superior or equal to 12.0 mL/min and inferior to 25.3 mL/min;
  a fourth set of surface bleedings is simulated to represent a fourth degree of severity of surface bleeding, each of the surface bleedings being simulated by adjusting the flow of the blood liquid provided by the pump system 2 to a specific value being chosen superior or equal to 25.3 mL/min and inferior to 102.0 mL/min;
  a fifth set of surface bleedings is simulated to represent a fifth degree of severity of surface bleeding, each of the surface bleedings being simulated by adjusting the flow of the blood liquid provided by the pump system 2 to a specific value being chosen superior or equal to 102.0 mL/min.

According to another example, based on the surface bleeding severity scale as defined by the expert surgeon as summarized in Table 3 above, several sets of surface bleedings are simulated—and preferably at least partially recorded as a video—with the above described simulating device, wherein:
  a first set of surface bleedings is simulated to represent a first degree of severity of surface bleeding, said first set of surface bleedings comprising
    at least one surface bleeding being simulated by mounting a plate 32 with through holes 321 arranged according to a pattern of 1 cm² and by adjusting the flow of the blood liquid provided by the pump system 2 to a specific value being chosen superior to 0 mL/min and inferior to 4.8 mL/min;
    at least one surface bleeding being simulated by mounting a plate 32 with through holes 321 arranged according to a pattern of 10 cm² and by adjusting the flow of the blood liquid provided by the pump system 2 to a specific value being chosen superior to 0 mL/min and inferior to 9.1 mL/min;
    at least one surface bleeding being simulated by mounting a plate 32 with through holes 321 arranged according to a pattern of 50 cm² and by adjusting the flow of the blood liquid provided by the pump system 2 to a specific value being chosen superior to 0 mL/min and inferior to 13.5 mL/min;
  a second set of surface bleedings is simulated to represent a second degree of severity of surface bleeding, said second set of surface bleedings comprising
    at least one surface bleeding being simulated by mounting a plate 32 with through holes 321 arranged according to a pattern of 1 cm² and by adjusting the flow of the blood liquid provided by the pump system 2 to a specific value being chosen superior or equal to 4.8 mL/min and inferior to 12.0 mL/min;
    at least one surface bleeding being simulated by mounting a plate 32 with through holes 321 arranged according to a pattern of 10 cm² and by adjusting the flow of the blood liquid provided by the pump system 2 to a specific value being chosen superior or equal to 9.1 mL/min and inferior to 20.0 mL/min;
    at least one surface bleeding being simulated by mounting a plate 32 with through holes 321 arranged according to a pattern of 50 cm² and by adjusting the flow of the blood liquid provided by the pump system 2 to a specific value being chosen superior or equal to 13.5 mL/min and inferior to 28.0 mL/min;
  a third set of surface bleedings is simulated to represent a third degree of severity of surface bleeding, said third set of surface bleedings comprising
    at least one surface bleeding being simulated by mounting a plate 32 with through holes 321 arranged according to a pattern of 1 cm² and by adjusting the flow of the blood liquid provided by the pump system 2 to a specific value being chosen superior or equal to 12.0 mL/min and inferior to 25.3 mL/min;
    at least one surface bleeding being simulated by mounting a plate 32 with through holes 321 arranged according to a pattern of 10 cm² and by adjusting the flow of the blood liquid provided by the pump system 2 to a specific value being chosen superior or equal to 20.0 mL/min and inferior to 71.3 mL/min;
    at least one surface bleeding being simulated by mounting a plate 32 with through holes 321 arranged according to a pattern of 50 cm² and by adjusting the flow of the blood liquid provided by the pump system 2 to a specific value being chosen superior or equal to 28.0 mL/min and inferior to 117.3 mL/min;
  a fourth set of surface bleedings is simulated to represent a fourth degree of severity of surface bleeding, said fourth set of surface bleedings comprising at least one surface bleeding being simulated by mounting a plate 32 with through holes 321 arranged according to a pattern of 1 cm² and by adjusting the flow of the blood liquid provided by the pump system 2 to a specific value being chosen superior or equal to 25.3 mL/min and inferior to 102.0 mL/min;

at least one surface bleeding being simulated by mounting a plate 32 with through holes 321 arranged according to a pattern of 10 cm² and by adjusting the flow of the blood liquid provided by the pump system 2 to a specific value being chosen superior or equal to 71.3 mL/min and inferior to 147.4 mL/min;

at least one surface bleeding being simulated by mounting a plate 32 with through holes 321 arranged according to a pattern of 50 cm² and by adjusting the flow of the blood liquid provided by the pump system 2 to a specific value being chosen superior or equal to 117.3 mL/min and inferior to 192.7 mL/min;

a fifth set of surface bleedings is simulated to represent a fifth degree of severity of surface bleeding, said fifth set of surface bleedings comprising at least one surface bleeding being simulated by mounting a plate 32 with through holes 321 arranged according to a pattern of 1 cm² and by adjusting the flow of the blood liquid provided by the pump system 2 to a specific value being chosen superior or equal to 102.0 mL/min;

at least one surface bleeding being simulated by mounting a plate 32 with through holes 321 arranged according to a pattern of 10 cm² and by adjusting the flow of the blood liquid provided by the pump system 2 to a specific value being chosen superior or equal to 147.4 mL/min;

at least one surface bleeding being simulated by mounting a plate 32 with through holes 321 arranged according to a pattern of 50 cm² and by adjusting the flow of the blood liquid provided by the pump system 2 to a specific value being chosen superior or equal to 192.7 mL/min.

The definition of the different sets of surface bleedings to be simulated—and preferably at least partially recorded as a video—for the surface bleeding severity scale as defined by the intervals summarized in Table 2 or in Table 4 above can be easily extrapolated from the above procedure as described with reference to the intervals of Table 3.

After having simulated and recorded all the required sets of surface bleedings, at least one set of training videos is made with the pool of training videos and one set of testing videos is made with the pool of testing videos.

The set of training videos can be prepared by selecting 36 videos from the pool of training videos, where for instance, within each TBS, two videos are sampled for each surface bleeding severity value.

Because the surface bleeding severity score represents a discretization of a continuum of flow rates, videos within each surface bleeding severity value are preferably sampled in order to be representative of bleeds occurring in the flow rate interval corresponding to that value.

For example, the two videos for each surface bleeding severity value are sampled such that the three videos of flow rates near the midpoint of the flow rate interval have a 90% chance of being sampled (30% each) while the videos near the endpoints of the flow rate interval have a 10% chance of being sampled (5% each).

For example, if the flow rate interval corresponding to a surface bleeding severity value of 3 is defined to be [3.0 ml/min, 5.0 ml/min[, videos of bleeding at flow rates of 3.4, 3.8, 4.2, 4.4, and 4.6 ml/min will be available for sampling into the training set. In this case, two videos are randomly sampled (without replacement) from these five videos in such a way that the videos corresponding to flow rates 3.8, 4.2, and 4.4 ml/min each have a 30% chance of being chosen, while the videos of bleeding flow rates of 2.4 and 4.6 ml/min will each have a 5% chance of being chosen.

This sampling is done for each score within each TBS, resulting in 12 videos for each TBS and 36 training videos in total.

The testing videos are sampled from the pool of testing videos created before. The testing videos are preferably sampled in the same manner as that described for the training videos. Specifically, the two videos for each surface bleeding severity value are sampled such that the three videos of flow rates near the midpoint of the flow rate interval have a 90% chance of being sample (30% each) while the videos near the endpoints of the flow rate interval have a 10% chance of being sampled (5% each). Even though the sampling method is the same as for the training videos, the result of the sampling for the testing videos is likely to be different from the result of the sampling for the training videos.

Such sampling also enables having a selection of 36 testing videos in total.

Instead of simulating and recording two videos of five flow rates uniformly distributed within the interval partition defining each surface bleeding severity score as described above (180 videos in total) and then performing a sampling among those videos to get 36 training videos and 36 testing videos, it is possible to first perform a sampling that will dictate—for each surface bleeding severity score and for each TBS—which two flow rates have to be used for simulation of a surface bleeding. Consequently, only the flow rates selected from the sampling are simulated and recorded in a video. With such an alternative procedure, a total of 72 videos are created corresponding to two replicates (one for the training and one for the testing) at each of 2 flow rates for each of the 6 surface bleeding severity scores, across the 3 TBS scenarios (2×2×6×3=72).

For the training, the 36 training videos are preferably organized as a training set where the videos are presented separately for each TBS setting and in increasing order of flow rates. In this way, surgeons are trained to visual increases in bleeding flow rates and associate them with increases in the surface bleeding severity value.

Following the training, each surgeon is then shown a set of testing videos that is different from the one used in the training phase.

One or several testing sets of videos can be prepared, based on the 36 testing videos resulting from the sampling as described above, where the selected testing videos are fully randomized.

Each video of the selected testing videos can be displayed several times.

According to a first example, the testing set of videos is created by displaying, in a random order, 3 times the 36 selected testing videos. Such example of testing set of videos thus comprises a sequence of 108 testing videos displayed randomly.

According to a second example, the testing set of videos is created by displaying, in a random order, the 36 selected testing videos and the 6 testing videos selected from the sampling for each TBS corresponding to the score 0. Such example of testing set of videos thus comprises a sequence of 42 testing videos displayed randomly.

Preferably, the testing sets of videos are prepared to comprise the same number of videos for each score of the surface bleeding scale. Possibly, the number of testing videos for the score 0 is larger than for the other scores of the surface bleeding scale.

non-hemostasis (failure). A score of 0 will define hemostasis and a surface bleeding severity score larger than 0 will be equivalent to non-hemostasis (failure). Such example of rules for the clinical investigation is summarized in Table 5 below.

TABLE 5

|  | Surface Bleeding Severity Score | | | | | |
|---|---|---|---|---|---|---|
|  | 0 | 1 | 2 | 3 | 4 | 5 |
| Verbal Descriptor of the bleeding | None | Minimal | Mild | Moderate | Severe | Extreme |
| Visual Descriptor of the bleeding | Dry | Oozing | Pooling | Flowing | Streaming | Gushing |
| Expected Intervention(s) | None | Manual pressure, cautery, adjuvant hemostat(s) | Manual pressure, cautery, suture, adjuvant hemostat(s) | Manual pressure, cautery, suture, adjuvant hemostat(s) | Manual pressure, cautery, suture, staples, tissue repair | Manual pressure, cautery, suture, staples, tissue repair |
| Eligible for Enrollment | No | Yes | Yes | Yes | No | No |
| Hemostatic Success | Yes | No | No | No | No | No |

Several different testing sets of videos can be prepared where the order of the selected testing videos to display is different.

Before performing a clinical investigation for testing the hemostatic performance of a product, each surgeon to be enrolled in the investigation as an investigator is trained and tested to be sure that he will be able to assess the severity of a surface bleeding according to the definition of the scores.

First an explanation of the surface bleeding severity scale and corresponding visual descriptors will be given to the investigators, based for instance on the information as given in Table 1 above.

Possibly, a preparatory set of videos are displayed to the investigator, where the videos show the plates 32 that have been used for simulating the different surface bleedings used in the training and testing videos without any flow of blood liquid.

After having watched the set of 36 training videos, the investigators are tested with a testing set of videos (e.g. a testing set of 42 videos or a testing set of 108 videos). For each videos of the set of testing videos, they are asked to assign a single surface bleeding severity score.

Enrollment of the investigators in the clinical investigation depends on their success in the recognition of the surface bleeding severity of the testing videos, which success depends on the degree of knowledge necessary for the clinical investigation.

The clinical investigation is indeed always based on the surface bleeding severity scale of reference, on which the investigators have been trained and tested, but the criterion for recognizing the severity of the surface bleeding can differ from a clinical investigation to another.

For instance, in a possible example of clinical investigation, bleeding severities with a surface bleeding severity score of 1, 2, or 3 will be eligible for inclusion into the clinical trial, whereas bleeding scores of 0, 4, and 5 will not be eligible for inclusion. In addition, surface bleeding severity scores will also determine hemostasis (success) versus With such proposed clinical investigation, the test of each investigator will be evaluated for determining the percentage of correct identification of study eligibility and the percentage of correct identification of hemostatic success.

Since it is important for investigators to be able to distinguish between an eligible versus ineligible bleeding site at baseline, and hemostasis versus non-hemostasis, a minimum score for these parameters must be achieved prior to approval for participation in the clinical investigation and enrollment of subjects. The minimum rate of positive recognitions may be for instance equal to 90%.

If an investigator fails, re-training and re-testing will be conducted. Preferably, an investigator has three tries to meet the minimum score for both parameters. The minimum score for both parameters must be achieved within a single test. If the investigator is unable to achieve the minimum score after 3 attempts, he/she will not be permitted to participate in the clinical investigation.

Clinical Investigation for Assessment of a Hemostatic Product

Once the investigators have been trained and successfully tested, they can perform the clinical procedure which has been defined for testing the hemostatic product under investigation.

Below is described an example of a possible procedure for assessment of the efficacy of a hemostatic product, also referred to a hemostatic implant material.

Although the properties of the ideal local hemostatic agent may vary according to the surgical specialty, some properties are universally valued including: rapid and effective control/cessation of bleeding; ability to make effective contact with the bleeding surface; acceptable safety profile; and reliable, easy to handle, quick to prepare.

Assessment of the safety and efficacy of a hemostat can be done by performing a specific clinical investigation.

Before the investigation, the investigators are trained on the appropriate application of the hemostatic product.

Subjects undergoing any surgical procedure could be eligible for enrolment into the clinical investigation. This could concern subjects undergoing either open or laparoscopic surgeries, like for instance cardiothoracic, abdominal, spinal, soft tissue, breast, or orthopedic lower extremity surgeries.

The Investigator will perform the surgery per his or her standard procedures, including conventional methods of hemostasis (pressure, ligature, cautery, etc.). Before the surgical procedure, a hemostatic product to be tested will be prepared per the corresponding instructions for use.

A study-specific stopwatch is preferably used to track hemostat application and the times of hemostasis evaluation.

Hemostasis is evaluated by the investigator using the specific surface bleeding severity scale that he has learned.

A score will be assigned at successive time points until hemostasis is achieved, for instance at the following time points:

Baseline—when evaluating intraoperative eligibility;
$1^{st}$ time point (e.g. at 3 minutes);
$2^{nd}$ time point (e.g. at 6 minutes); and
$3^{rd}$ time point (e.g. at 10 minutes).

Bleeding severity assessments can be made by one or more investigators, but has to be done independently.

In case of an assessment by two investigators, it is considered that there is hemostasis if both investigators assign a score of 0 at the same assessment time point. All other scores are considered as a failure of hemostasis. The target bleeding site will be assessed at every time point, up until hemostasis is achieved.

In cases where hemostasis is not achieved at the last time point, the investigator may use whatever means necessary in order to control bleeding.

The efficacy of the hemostatic product under investigation is then assessed by processing and comparing all the data gathered during the procedure.

In addition to the advantages mentioned above, the device and method for simulation of surface bleedings presented in this document can help the surgeons to establish their diagnostics in respect of the severity of the bleedings, and thus help them making their choice of the hemostatic agent to use in an easier and faster way.

The proposed device and method for simulation of surface bleedings also participate to the harmonization in the surface bleedings recognition, and thus to the harmonization of the diagnostic methods and practice among surgeons, which is generally positive for the health of the patient.

Another advantage of the proposed device and method for simulation of surface bleedings is that it could prevent performing in vivo studies on animals for testing of an hemostatic product, which has therefore a very positive ethical effect.

BIBLIOGRAPHIC REFERENCES

"Acute in-vivo evaluation of bleeding with Gelfoam plus saline and Gelfoam plus human thrombin using a liver square lesion model in swine" (J Thromb Thrombolysis. 2009 Jul.; 28(1):1-5. doi: 10.1007/s11239-008-0249-3. Epub 2008 Jul. 16)

The invention claimed is:
1. A device to simulate a surface bleeding, comprising:
a source of a blood liquid, in particular a synthetic blood liquid or a blood liquid having been removed from a human body;
a pump system connected to the source of the blood liquid and configured to provide a controlled flow of said blood liquid;
a wound simulator having an open chamber connected to the pump system to receive the controlled flow of the blood liquid, wherein the wound simulator comprises a set of interchangeable plates,
plates within the set having a plurality of holes arranged through said plates according to specific hole patterns, wherein the holes are regularly spaced apart from one another, and wherein each plate of the set of interchangeable plates has a specific hole pattern with a different surface area from the other plates of the set, and
each plate within the set of interchangeable plates being adapted to be removably mounted on the wound simulator to close the open chamber, so that the blood liquid flows out of the chamber through the holes of the plate mounted on the wound simulator,
the pump system being adapted to adjust the flow rate of the blood liquid, depending on the plate mounted on the wound simulator, to a specific value within an interval defining a specific degree of severity of surface bleeding within a scale of surface bleeding severity to achieve the degree of severity of surface bleeding corresponding to a set of surface bleedings, the set of surface bleedings including a first set of surface bleedings representing a first degree of severity of surface bleeding, each of the surface bleedings being simulated by adjusting the flow of the blood liquid provided by the pump system to a specific value being chosen superior to 0 mL/min and inferior to 4.8 mL/min;
a second set of surface bleedings representing a second degree of severity of surface bleeding, each of the surface bleedings being simulated by adjusting the flow of the blood liquid provided by the pump system to a specific value being chosen superior or equal to 4.8 mL/min and inferior to 12.0 mL/min; and
a third set of surface bleedings representing a third degree of severity of surface bleeding, each of the surface bleedings being simulated by adjusting the flow of the blood liquid provided by the pump system to a specific value being chosen superior or equal to 12.0 mL/min and inferior to 25.3 mL/min.

2. The device of claim 1, wherein the specific hole pattern of a plate within the set is of a different pattern from the other plates of the set.

3. The device of claim 1, wherein the specific hole patterns are square hole patterns.

4. The device of claim 1, wherein the holes are provided in each of the interchangeable plates at a density of at least 50 holes/cm$^2$.

5. The device of claim 1, wherein the holes are provided in each of the interchangeable plates at a density of 100 holes/cm$^2$.

6. The device of claim 1, wherein the number and diameter of the holes provided in each of the interchangeable plates are set to reproduce the visual appearance of a bleeding surface.

7. The device of claim 6, wherein the holes provided in each one of the interchangeable plates have all the same diameter, said diameter being comprised between 0.2 mm and 1 mm.

8. The device of claim 6, wherein the holes provided in each one of the interchangeable plates have all the same diameter, said diameter being of 0.5 mm.

9. The device of claim 1, wherein the holes provided in each one of the interchangeable plates are spaced apart with a pitch comprised between 0.4 mm and 2 mm.

10. The device of claim 1, wherein the holes provided in each one of the interchangeable plates are spaced apart with a pitch of 1 mm.

11. The device of claim 1, wherein the wound simulator further comprises a gravity fed gutter system to drain out the blood liquid having passed through the holes of the plate and guide the blood liquid into a receiving container.

12. The device of claim 1, further comprising a pressure monitoring system connected to the pump system to measure the pressure of the blood liquid supplied to the chamber of the wound simulator.

13. The device of claim 1, wherein the pump system comprises a peristaltic pump provided with tubing for circulation of the blood liquid from the blood source to the open chamber.

14. The device of claim 1, wherein the pump system comprises a pump controller for control of the flow of the blood liquid from the blood source to the open chamber.

15. The device of claim 1, wherein the plates of the set of interchangeable plates have rectangular hole patterns of different sizes.

16. The device of claim 1, wherein the plates of the set of interchangeable plates have circular hole patterns of different sizes.

17. The device of claim 1, wherein the plates of the set of interchangeable plates have hole patterns with holes of different diameters.

18. A method for simulating a plurality of different surface bleedings with a device comprising:
a source of a blood liquid, in particular a synthetic blood liquid or a blood liquid having been removed from a human body;
a pump system connected to the source of the blood liquid and configured to provide a controlled flow of said blood liquid;
a wound simulator having an open chamber connected to the pump system to receive the controlled flow of the blood liquid, wherein the wound simulator comprises a set of interchangeable plates,
plates within the set having a plurality of holes arranged through said plates according to specific hole patterns, wherein the holes are regularly spaced apart from one another, and wherein each plate of the set of interchangeable plates has a specific hole pattern with a different surface area from the other plates of the set, and
each plate within the set of interchangeable plates being adapted to be removably mounted on the wound simulator to close the open chamber, so that the blood liquid flows out of the chamber through the holes of the plate mounted on the wound simulator, wherein each surface bleeding of each set of surface bleedings is simulated by mounting on the wound simulator a specific plate chosen among the set of interchangeable plates, and adjusting the flow rate of the blood liquid provided by the pump system to a specific value
wherein a first set of surface bleedings is simulated to represent a first degree of severity of surface bleeding, each of the surface bleedings being simulated by adjusting the flow of the blood liquid provided by the pump system to a specific value being chosen superior to 0 mL/min and inferior to 4.8 mL/min;
a second set of surface bleedings is simulated to represent a second degree of severity of surface bleeding, each of the surface bleedings being simulated by adjusting the flow of the blood liquid provided by the pump system to a specific value being chosen superior or equal to 4.8 mL/min and inferior to 12.0 mL/min; and
a third set of surface bleedings is simulated to represent a third degree of severity of surface bleeding, each of the surface bleedings being simulated by adjusting the flow of the blood liquid provided by the pump system to a specific value being chosen superior or equal to 12.0 mL/min and inferior to 25.3 mL/min.

19. The method of claim 18, wherein:
a fourth set of surface bleedings is simulated to represent a fourth degree of severity of surface bleeding, each of the surface bleedings being simulated by adjusting the flow of the blood liquid provided by the pump system to a specific value being chosen superior or equal to 25.3 mL/min and inferior to 102.0 mL/min; and
a fifth set of surface bleedings is simulated to represent a fifth degree of severity of surface bleeding, each of the surface bleedings being simulated by adjusting the flow of the blood liquid provided by the pump system to a specific value being chosen superior or equal to 102.0 mL/min.

20. The method of claim 18, wherein each of the simulated surface bleedings is recorded as a video.

21. The method of claim 19, wherein each of the simulated surface bleedings is recorded as a video.

22. A method for simulating a plurality of different surface bleedings with a device comprising:
a source of a blood liquid, in particular a synthetic blood liquid or a blood liquid having been removed from a human body;
a pump system connected to the source of the blood liquid and configured to provide a controlled flow of said blood liquid;
wound simulator having an open chamber connected to the pump system to receive the controlled flow of the blood liquid, wherein the wound simulator comprises a set of interchangeable plates, wherein:
a first set of surface bleedings is simulated to represent a first degree of severity of surface bleeding, said first set of surface bleedings comprising
at least one surface bleeding being simulated by mounting a plate with through holes arranged according to a hole pattern having a surface area of 1 $cm^2$ and by adjusting the flow of the blood liquid provided by the pump system to a specific value being chosen superior to 0 mL/min and inferior to 4.8 mL/min;
at least one surface bleeding being simulated by mounting a plate with through holes arranged according to a hole pattern having a surface area of 10 $cm^2$ and by adjusting the flow of the blood liquid provided by the pump system to a specific value being chosen superior to 0 mL/min and inferior to 9.1 mL/min; and
at least one surface bleeding being simulated by mounting a plate with through holes arranged according to a hole pattern having a surface area of 50 $cm^2$ and by adjusting the flow of the blood liquid provided by the pump system to a specific value being chosen superior to 0 mL/min and inferior to 13.5 mL/min;

a second set of surface bleedings is simulated to represent a second degree of severity of surface bleeding, said second set of surface bleedings comprising
   at least one surface bleeding being simulated by mounting a plate with through holes arranged according to a hole pattern having a surface area of 1 cm² and by adjusting the flow of the blood liquid provided by the pump system to a specific value being chosen superior or equal to 4.8 mL/min and inferior to 12.0 mL/min;
   at least one surface bleeding being simulated by mounting a plate with through holes arranged according to a hole pattern having a surface area of 10 cm² and by adjusting the flow of the blood liquid provided by the pump system to a specific value being chosen superior or equal to 9.1 mL/min and inferior to 20.0 mL/min; and
   at least one surface bleeding being simulated by mounting a plate with through holes arranged according to a hole pattern having a surface area of 50 cm² and by adjusting the flow of the blood liquid provided by the pump system to a specific value being chosen superior or equal to 13.5 mL/min and inferior to 28.0 mL/min;
a third set of surface bleedings is simulated to represent a third degree of severity of surface bleeding, said third set of surface bleedings comprising
   at least one surface bleeding being simulated by mounting a plate with through holes arranged according to a hole pattern having a surface area of 1 cm² and by adjusting the flow of the blood liquid provided by the pump system to a specific value being chosen superior or equal to 12.0 mL/min and inferior to 25.3 mL/min;
   at least one surface bleeding being simulated by mounting a plate with through holes arranged according to a hole pattern having a surface area of 10 cm² and by adjusting the flow of the blood liquid provided by the pump system to a specific value being chosen superior or equal to 20.0 mL/min and inferior to 71.3 mL/min; and
   at least one surface bleeding being simulated by mounting a plate with through holes arranged according to a hole pattern having a surface area of 50 cm² and by adjusting the flow of the blood liquid provided by the pump system to a specific value being chosen superior or equal to 28.0 mL/min and inferior to 117.3 mL/min;
a fourth set of surface bleedings is simulated to represent a fourth degree of severity of surface bleeding, said fourth set of surface bleedings comprising
   at least one surface bleeding being simulated by mounting a plate with through holes arranged according to a hole pattern having a surface area of 1 cm² and by adjusting the flow of the blood liquid provided by the pump system to a specific value being chosen superior or equal to 25.3 mL/min and inferior to 102.0 mL/min;
   at least one surface bleeding being simulated by mounting a plate with through holes arranged according to a hole pattern having a surface area of 10 cm² and by adjusting the flow of the blood liquid provided by the pump system to a specific value being chosen superior or equal to 71.3 mL/min and inferior to 147.4 mL/min; and
   at least one surface bleeding being simulated by mounting a plate with through holes arranged according to a hole pattern having a surface area of 50 cm² and by adjusting the flow of the blood liquid provided by the pump system to a specific value being chosen superior or equal to 117.3 mL/min and inferior to 192.7 mL/min;
a fifth set of surface bleedings is simulated to represent a fifth degree of severity of surface bleeding, said fifth set of surface bleedings comprising
   at least one surface bleeding being simulated by mounting a plate with through holes arranged according to a hole pattern having a surface area of 1 cm² and by adjusting the flow of the blood liquid provided by the pump system to a specific value being chosen superior or equal to 102.0 mL/min;
   at least one surface bleeding being simulated by mounting a plate with through holes arranged according to a hole pattern having a surface area of 10 cm² and by adjusting the flow of the blood liquid provided by the pump system to a specific value being chosen superior or equal to 147.4 mL/min; and
   at least one surface bleeding being simulated by mounting a plate with through holes arranged according to a hole pattern having a surface area of 50 cm² and by adjusting the flow of the blood liquid provided by the pump system to a specific value being chosen superior or equal to 192.7 mL/min.

23. The method of claim 22, wherein each of the simulated surface bleedings is recorded as a video.

24. A method for simulating a plurality of different surface bleedings with a device comprising:
   a source of a blood liquid, in particular a synthetic blood liquid or a blood liquid having been removed from a human body;
   a pump system connected to the source of the blood liquid and configured to provide a controlled flow of said blood liquid;
   a wound simulator having an open chamber connected to the pump system to receive the controlled flow of the blood liquid, wherein the wound simulator comprises a set of interchangeable plates,
   plates within the set having a plurality of holes arranged through said plates according to specific hole patterns, wherein the holes are regularly spaced apart from one another, and wherein each plate of the set of interchangeable plates has a specific hole pattern with a different surface area from the other plates of the set, and
   each plate within the set of interchangeable plates being adapted to be removably mounted on the wound simulator to close the open chamber, so that the blood liquid flows out of the chamber through the holes of the plate mounted on the wound simulator, wherein each surface bleeding of each set of surface bleedings is simulated by mounting on the wound simulator a specific plate chosen among the set of interchangeable plates, and adjusting the flow rate of the blood liquid provided by the pump system to a specific value, wherein
   a first set of surface bleedings is simulated to represent a first severity of surface bleeding, each of the surface bleedings being simulated by adjusting the flow of the blood liquid provided by the pump system to a specific value being chosen superior or equal to 25.3 mL/min and inferior to 102.0 mL/min; and a second set of surface bleedings is simulated to represent a second severity of surface bleeding, each of the surface bleedings being simulated by adjusting the flow of the blood liquid provided by the pump system to a specific value being chosen superior or equal to 102.0 mL/min.

25. The method of claim 24, wherein each of the simulated surface bleedings is recorded as a video.

26. A method for simulating a plurality of different surface bleedings with a device comprising:
a source of a blood liquid, in particular a synthetic blood liquid or a blood liquid having been removed from a human body;
a pump system connected to the source of the blood liquid and configured to provide a controlled flow of said blood liquid;
wound simulator having an open chamber connected to the pump system to receive the controlled flow of the blood liquid, wherein the wound simulator comprises a set of interchangeable plates,
wherein:
a first set of surface bleedings is simulated to represent a first degree of severity of surface bleeding, said first set of surface bleedings comprising
at least one surface bleeding being simulated by mounting a plate with through holes arranged according to a hole pattern having a surface area of 1 $cm^2$ and by adjusting the flow of the blood liquid provided by the pump system to a specific value being chosen superior to 0 mL/min and inferior to 4.8 mL/min;
at least one surface bleeding being simulated by mounting a plate with through holes arranged according to a hole pattern having a surface area of 10 $cm^2$ and by adjusting the flow of the blood liquid provided by the pump system to a specific value being chosen superior to 0 mL/min and inferior to 9.1 mL/min; and
at least one surface bleeding being simulated by mounting a plate with through holes arranged according to a hole pattern having a surface area of 50 $cm^2$ and by adjusting the flow of the blood liquid provided by the pump system to a specific value being chosen superior to 0 mL/min and inferior to 13.5 mL/min;
a second set of surface bleedings is simulated to represent a second degree of severity of surface bleeding, said second set of surface bleedings comprising
at least one surface bleeding being simulated by mounting a plate with through holes arranged according to a hole pattern having a surface area of 1 $cm^2$ and by adjusting the flow of the blood liquid provided by the pump system to a specific value being chosen superior or equal to 4.8 mL/min and inferior to 12.0 mL/min;
at least one surface bleeding being simulated by mounting a plate with through holes arranged according to a hole pattern having a surface area of 10 $cm^2$ and by adjusting the flow of the blood liquid provided by the pump system to a specific value being chosen superior or equal to 9.1 mL/min and inferior to 20.0 mL/min; and
at least one surface bleeding being simulated by mounting a plate with through holes arranged according to a hole pattern having a surface area of 50 $cm^2$ and by adjusting the flow of the blood liquid provided by the pump system to a specific value being chosen superior or equal to 13.5 mL/min and inferior to 28.0 mL/min;
a third set of surface bleedings is simulated to represent a third degree of severity of surface bleeding, said third set of surface bleedings comprising
at least one surface bleeding being simulated by mounting a plate with through holes arranged according to a hole pattern having a surface area of 1 $cm^2$ and by adjusting the flow of the blood liquid provided by the pump system to a specific value being chosen superior or equal to 12.0 mL/min and inferior to 25.3 mL/min;
at least one surface bleeding being simulated by mounting a plate with through holes arranged according to a hole pattern having a surface area of 10 $cm^2$ and by adjusting the flow of the blood liquid provided by the pump system to a specific value being chosen superior or equal to 20.0 mL/min and inferior to 71.3 mL/min; and
at least one surface bleeding being simulated by mounting a plate with through holes arranged according to a hole pattern having a surface area of 50 $cm^2$ and by adjusting the flow of the blood liquid provided by the pump system to a specific value being chosen superior or equal to 28.0 mL/min and inferior to 117.3 mL/min.

27. The method of claim 26, wherein each of the simulated surface bleedings is recorded as a video.

28. A method for simulating a plurality of different surface bleedings with a device comprising: a source of a blood liquid, in particular a synthetic blood liquid or a blood liquid having been removed from a human body; a pump system connected to the source of the blood liquid and configured to provide a controlled flow of said blood liquid; wound simulator having an open chamber connected to the pump system to receive the controlled flow of the blood liquid, wherein the wound simulator comprises a set of interchangeable plates, wherein: —a set of surface bleedings is simulated to represent a degree of severity of surface bleeding, said set of surface bleedings comprising o at least one surface bleeding being simulated by mounting a plate with through holes arranged according to a hole pattern having a surface area of 1 $cm^2$ and by adjusting the flow of the blood liquid provided by the pump system to a specific value being chosen superior or equal to 25.3 mL/min and inferior to 102.0 mL/min; o at least one surface bleeding being simulated by mounting a plate with through holes arranged according to a hole pattern having a surface area of 10 $cm^2$ and by adjusting the flow of the blood liquid provided by the pump system to a specific value being chosen superior or equal to 71.3 mL/min and inferior to 147.4 mL/min; and o at least one surface bleeding being simulated by mounting a plate with through holes arranged according to a hole pattern having a surface area of 50 $cm^2$ and by adjusting the flow of the blood liquid provided by the pump system to a specific value being chosen superior or equal to 117.3 mL/min and inferior to 192.7 mL/min; —another set of surface bleedings is simulated to represent another degree of severity of surface bleeding, said another set of surface bleedings comprising o at least one surface bleeding being simulated by mounting a plate with through holes arranged according to a hole pattern having a surface area of 1 $cm^2$ and by adjusting the flow of the blood liquid provided by the pump system to a specific value being chosen superior or equal to 102.0 mL/min; o at least one surface bleeding being simulated by mounting a plate with through holes arranged according to a hole pattern having a surface area of 10 cm$^2$ and by adjusting the flow of the blood liquid provided by the pump system to a specific value being chosen superior or equal to 147.4 mL/min; and o at least one surface bleeding being simulated by mounting a plate with through holes arranged according to a hole pattern having a surface area of 50 cm$^2$ and by adjusting the flow of the blood liquid provided by the pump system to a specific value being chosen superior or equal to 192.7 mL/min.

29. The method of claim 28, wherein each of the simulated surface bleedings is recorded as a video.

30. A device to simulate a surface bleeding, comprising:

a source of a blood liquid, in particular a synthetic blood liquid or a blood liquid having been removed from a human body;

a pump system connected to the source of the blood liquid and configured to provide a controlled flow of said blood liquid;

a wound simulator having an open chamber connected to the pump system to receive the controlled flow of the blood liquid, wherein the wound simulator comprises a set of interchangeable plates, plates within the set having a plurality of holes arranged through said plates according to a specific hole patterns, wherein the holes are regularly spaced apart from one another, and wherein each plate of the set of interchangeable plates has a specific hole pattern with a different surface area from the other plates of the set, and each plate within the set of interchangeable plates being adapted to be removably mounted on the wound simulator to close the open chamber, so that the blood liquid flows out of the chamber through the holes of the plate mounted on the wound simulator, the pump system being adapted to adjust the flow rate of the blood liquid, depending on the plate mounted on the wound simulator, to a specific value within an interval defining a specific degree of severity of surface bleeding within a scale of surface bleeding severity to achieve the degree of severity of surface bleeding corresponding to a set of surface bleedings, the set of surface bleedings including a first set of surface bleedings simulated to represent a first severity of surface bleeding, each of the surface bleedings being simulated by adjusting the flow of the blood liquid provided by the pump system to a specific value being chosen superior or equal to 25.3 mL/min and inferior to 102.0 mL/min; and a second set of surface bleedings simulated to represent a second severity of surface bleeding, each of the surface bleedings being simulated by adjusting the flow of the blood liquid provided by the pump system to a specific value being chosen superior or equal to 102.0 mL/min.

* * * * *